United States Patent [19]

Fukatsu

[11] Patent Number: 4,524,268

[45] Date of Patent: Jun. 18, 1985

[54] AUTOMATIC BANK NOTE TRANSACTION SYSTEM

[75] Inventor: Kunio Fukatsu, Ebina, Japan

[73] Assignee: Tokyo Shibaura Denki Kabushiki Kaisha, Kawasaki, Japan

[21] Appl. No.: 580,135

[22] Filed: Feb. 14, 1984

[30] Foreign Application Priority Data

Feb. 15, 1983 [JP] Japan .................................. 58-23294

[51] Int. Cl.[3] .............................................. G06F 15/30

[52] U.S. Cl. .................................... 235/379; 209/534; 221/6; 271/9

[58] Field of Search ..................... 235/379; 271/3.1, 9; 209/534; 221/6

[56] References Cited

U.S. PATENT DOCUMENTS

| | | | |
|---|---|---|---|
| 4,369,360 | 1/1983 | Tsuji | 235/379 |
| 4,398,088 | 8/1983 | Hirose et al. | 235/379 |
| 4,428,501 | 1/1984 | Osako | 271/9 X |
| 4,459,052 | 7/1984 | Lundblad | 235/379 X |
| 4,465,192 | 8/1984 | Ohba et al. | 209/534 |

FOREIGN PATENT DOCUMENTS 140483 11/1981 Japan .

*Primary Examiner*—David L. Trafton
*Attorney, Agent, or Firm*—Cushman, Darby & Cushman

[57] ABSTRACT

An automatic bank note transaction system according to the present invention is provided with a center CPU and a plurality of automatic bank note transaction apparatuses. The plurality of bank note transaction apparatuses is divided into a plurality of groups, and the system comprises a remaining bill monitor for producing data indicating from whcih apparatus of a group surplus bills are to be removed and which apparatus of the given group is to be replenished with the surplus bills.

13 Claims, 26 Drawing Figures

FIG. 15

| | ROWS \ COLUMNS | MACHINE A | MACHINE B | MACHINE C |
|---|---|---|---|---|
| | | A | B | C |
| 10 | BILL AMOUNT FOR EACH MACHINE | 6600000 | 5650000 | 5500000 |
| 11 | NUMBER OF BILLS OF 3RD DENOMI. | 600 | 550 | 500 |
| 12 | NUMBER OF BILLS OF 2ND DENOMI. | 600 | 150 | 500 |
| 13 | END (3RD) | 0 | 0 | 0 |
| 14 | ENDING (3RD) | 0 | 0 | 0 |
| 15 | REPLENISHABLE (3RD) | 1 | 1 | 1 |
| 16 | NEAR-FULL (3RD) | 0 | 0 | 0 |
| 17 | FULL (3RD) | 0 | 0 | 0 |
| 18 | END (2 ND) | 0 | 0 | 0 |
| 19 | ENDING (2 ND) | 0 | 1 | 0 |
| 20 | REPLENISHABLE (2 ND) | 1 | 0 | 0 |
| 21 | NEAR-FULL (3 RD) | 0 | 0 | 0 |
| 22 | FULL (3 RD) | 0 | 0 | 0 |
| 23 | REJECTED BILL NUMBER (3RD) | 02 | 01 | 03 |
| 24 | REJECTED FREQUENCY (2 ND) | 01 | 04 | 00 |
| 25 | PERSONNEL HOLDING AMOUNT | 00000 | 02000 | 00000 |

AUTOMATIC BANK NOTE TRANSACTION SYSTEM

BACKGROUND OF THE INVENTION

The present invention relates to an automatic bank note transaction system and, more particularly, to an improvement of an automatic bank note transaction system wherein a central processing unit of a bank center (to be referred to as a center CPU hereinafter) and a plurality of automatic bank note transaction apparatuses are connected in an on-line basis.

Teller procedures have been greatly automated due to widespread development of automatic bank note transaction apparatus such as automatic deposit apparatus or automatic withdrawal apparatus. In this situation, a number of automatic bank note transaction apparatuses are frequenly installed in each bank branch. The automatic bank note transaction apparatuses are welcomed by the customers who conveniently use them. However, the bank personnel must frequently replenish the bills in the apparatuses, resulting in time-consuming, cumbersome operations. In addition, a great amount of bills (to be dispensed) must be usually stored in the apparatuses.

In order to maximize the use of bills, an automatic bank note transaction apparatus of a circulation type is being developed wherein the received bills are used as bills to be dispensed, and the number of times of replenishing operations is decreased to effectively utilize the bills. Conventionally, each automatic bank note transaction apparatus communicates with the center CPU and is used independently of other automatic bank note transaction apparatuses which also independently communicate with the center CPU. Under this circumstance, when a given bank branch has a plurality of automatic bank note transaction apparatuses, the amounts of bills stored in them inevitably vary due to the frequency of utilization of customer the apparatuses The different amounts of bills stored in the different apparatuses cannot be detected. As a result, effective bill replenishing operations and utilization of bills cannot be properly performed.

SUMMARY OF THE INVENTION

The present invention has been developed in consideration of the above situation, and its object is to provide an automatic bank note transaction system which is capable of easily detecting from which apparatus excessive bills or bank notes are to be removed and which apparatus is to be replenished with the excessive bills in a given bank branch, so that the bills can be effectively replenished in a plurality of apparatuses of the system, and so that surplus bills are effectively transferred among the plurality of apparatuses.

According to one aspect of the present invention, there is provided an automatic bank note transaction system which comprises a central processing unit, and a plurality of automatic bank note transaction apparatuses which are connected to said central processing unit in an on-line basis, each automatic bank note transaction apparatus including a housing; storing means disposed in said housing to store bank notes therein; and detecting means for detecting an amount of bank notes stored in said storing means and generating a detection signal, and said system further comprising regulating means, connected between said central processing unit and said plurality of automatic bank note transaction apparatuses, for discriminating in response to the detection signal from said detecting means, which automatic bank note transaction apparatus is capable of dispensing the bank notes since said storing means thereof is filled with the bank notes and, which automatic bank note transaction apparatus requires bank note replenishment since said storing means thereof is empty, and for generating a discrimination signal; and output means, connected to said regulating means, for generating output data indicating the apparatus from which excessive bank notes are to be dispensed and which apparatus is to be replenished with the bank notes in response to the discrimination signal from said regulating means.

BRIEF DESCRIPTION OF THE DRAWINGS

FIG. 15 is a view showing the basic representation of a data storage;

DETAILED DESCRIPTION OF THE PREFERRED EMBODIMENTS

An automatic bank note transaction system according to one embodiment of the present invention will be described in detail with reference to FIGS. 1 to 16.

Figure 1:
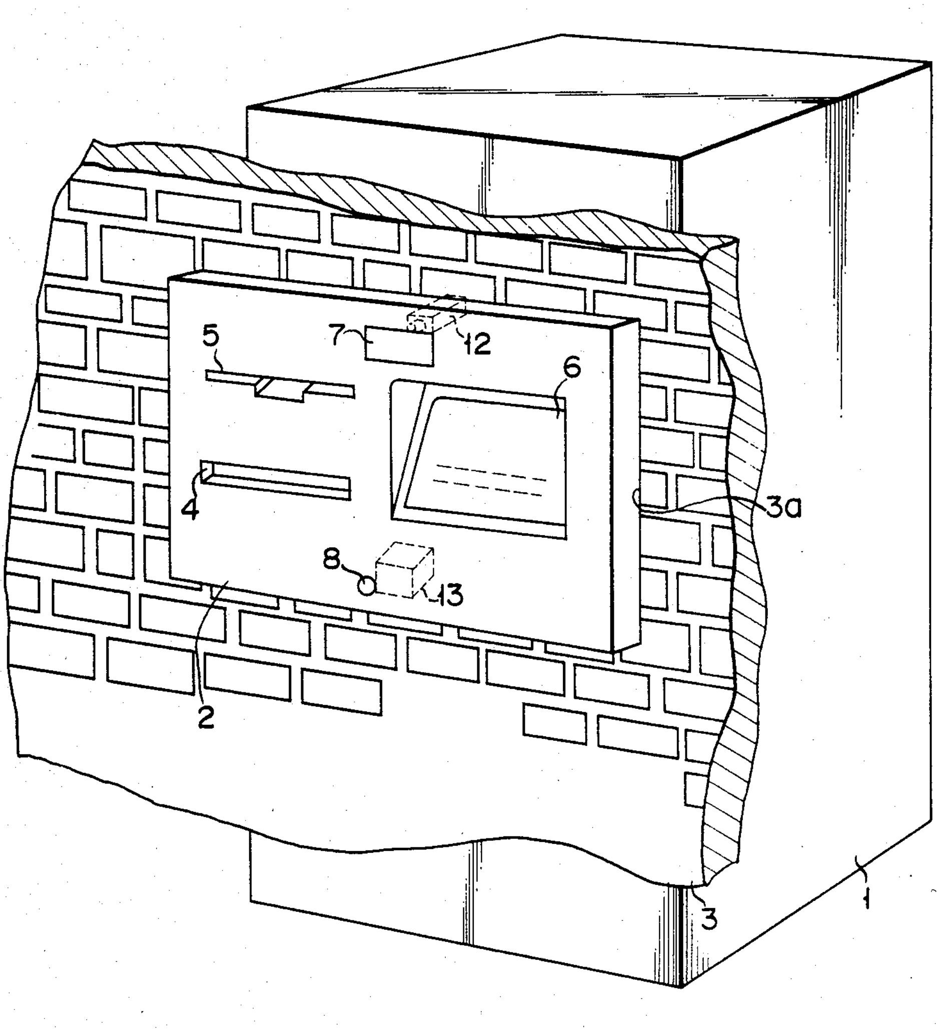
FIG. 1 is a perspective view showing an installation state of one automatic bank note transaction apparatus used in one embodiment of an automatic bank note transaction system according to the present invention.

This automatic bank note transaction system comprises three automatic bank note transaction apparatuses 100*a*, 100*b* and 100*c* in this embodiment. The automatic bank note transaction apparatuses 100*a*, 100*b* and 100*c* have the same construction, so that the apparatuses 100*a* to 100*c* are exemplified by the automatic bank note transaction apparatus 100*a*, and a description of the other apparatuses 100*b* and 100*c* are omitted. FIG. 1 shows an installation state of the first automatic bank note transaction apparatus 100*a* having a bill-circulating type receiving/dispensing function wherein received bills are used as bills to be dispensed. The first automatic bank note transaction apparatus 100*a* has a main body 1. An operation panel 2 extends forward from the front surface of the main body 1 through a through hole 3*a* of a wall 3, so that the apparatus 100*a* is installed partially exposed at the machine service corner of a bank.

A bill receiving/dispensing port 4, a card/passbook receiving/dispensing port 5, a display/input section 6, a monitor window 7, a customer detecting section 8 are arranged on the operation panel 2. The main housing 1 has a receiving/dispensing unit 9 corresponding to the bill receiving/dispensing port 4, a card/passbook unit 10 corresponding to the card/passbook receiving/dispensing port 5, a display/input unit 11 corresponding to the display/input section 6, a monitor camera 12 as a photographing means through the monitor window 7, and a customer sensor 13 corresponding to the customer detecting section 8.

Figure 2:
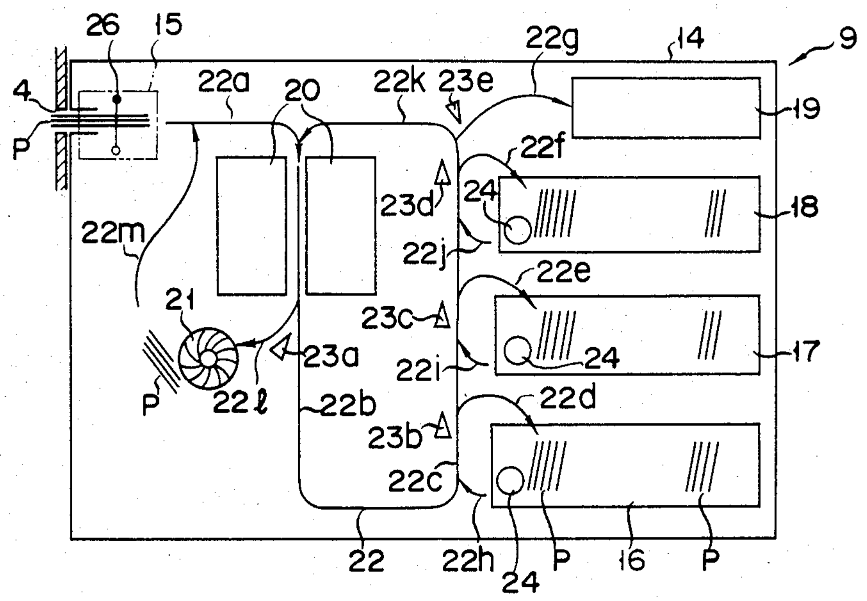
FIG. 2 is a side view schematically showing the configuration of a receiving/dispensing unit built into the automatic bank note transaction apparatus shown in FIG. 1.

The receiving/dispensing unit 9 will be described with reference to FIG. 2.

The receiving/dispensing unit 9 has a housing 14. A bill receiving/dispensing mechanism 15 is disposed at the front (left-hand side in FIG. 2) upper portion of the housing 14 to oppose the bill receiving/dispensing port 4. First to third storage sections 16 to 18 and a recovered bill compartment 19 are disposed from the bottom to the top of the rear side (right-hand side in FIG. 2) of the housing 14. The first storage section 16 stores damaged bills among the received bills, unfit bills (to be dispensed) of third denomination ($100, Σ20 or DM100) and second denomination ($10, Σ5 or DM10), and the received bills of first denomination ($50, Σ10 or DM50). The second storage section 17 stores the bills for dispensation of second denomination, and the received bills of the second denomination but not damaged bills. The third storage section 18 stores the bills for dispensation of the third denomination, and the received bills of the third denomination but not damaged bills. The recovered bill compartment 19 stores the bills which are left in the bill receiving/dispensing port 4 due to customer's carelessness.

The housing 14 also has a discrimination section 20 for discriminating a bill P and a temporary stacking section 21 for temporarily stacking the bills. A bill convey path 22 consisting of bill convey path portions 22*a* to 22*m* is formed in the housing 14. The bill P is conveyed in components of the apparatus through the convey path portions 22*a* to 22*m*. Selector gates 23*a* to 23*e* are disposed at branch portions of the bill convey path 22 and are driven by rotary solenoids (not shown). Bill detectors (not shown) are arranged along the bill convey path 22 as needed.

The bill convey path 22 is formed in the following manner. The convey path portion (to be referred to as a take-in convey path hereinafter) 22*a* starts from the bill receiving/dispensing mechanism 15 corresponding to the bill receiving/dispensing port 4. The take-in convey path 22*a* communicates with the convey path portion (to be referred to as a central convey path hereinafter) 22*b* which has the discrimination section 20 at its intermediate portion. The control convey path 22*b* communicates with the convey path portion (to be referred to as a sorting convey path hereinafter) 22*c* extending to the bill storage sections 16, 17 and 18.

The convey path portions (to be referred to as first to fourth storing convey paths hereinafter) 22*d* to 22*g* for respectively storing the bills P in the first to third storage sections 16 to 18 and the recovered bill compartment 19 are branched from the sorting convey path 22*c*. The convey path portions (referred to as first to third dispensing convey paths hereinafter) 22*h*, 22*i* and 22*j* for respectively conveying the bills dispensed by dispensing mechanisms 24 from the first to third bill storage sections 16 to 18 merge into the sorting convey path 22*c*.

The trailing end of the sorting convey path 22*c* communicates with the leading end of the central convey path 22*b* through the convey path portion (to be referred to as a communicating convey path hereinafter) 22*k*. The convey path portion (to be referred to as a branched convey path hereinafter) 22*l* is branched from the intermediate portion of the central convey path 22*b* to convey the bill P to the temporary stacking section 21.

The convey path (to be referred to as a delivering convey path hereinafter) 22*m* is formed to deliver the bill P from the temporary stacking section 21 to the receiving/dispensing mechanism 15.

Figure 3A:
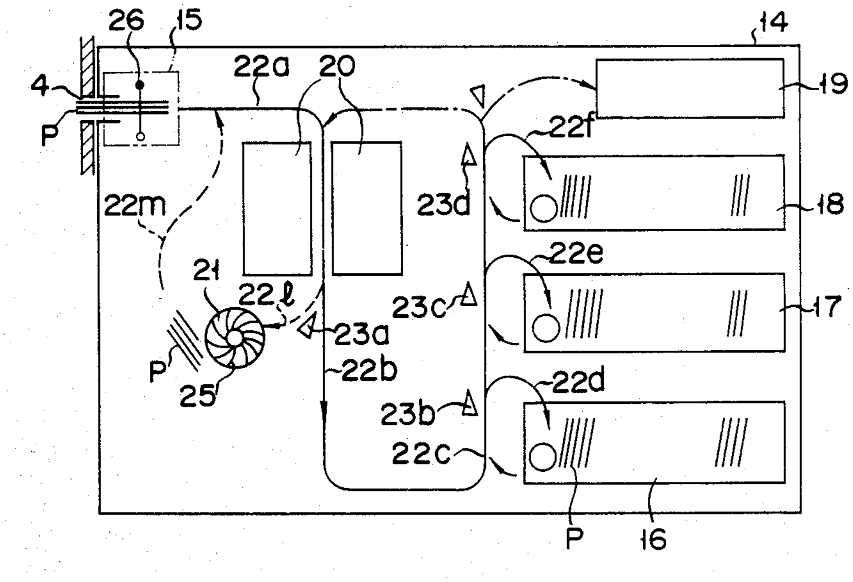
FIG. 3A is a side view showing a bill flow when a deposit is made.

The flow of the bill P in the deposit transaction mode will be described with reference to FIG. 3A. The bills stacked through the bill receiving/dispensing port 4 are taken by the receiving/dispensing mechanism 15 opposing the port 4 into the apparatus one by one. The bill is then fed to the central convey path 22*b* through the take-in convey path 22*a*. The bill is then subjected to discrimination of a denomination and authenticity by means of the discrimination section 20 disposed midway along the central convey path 22*b*. As a result, the bill discriminated to be authentic is conveyed along the central convey path 22*b* and is fed in the sorting convey path 22*c*. The selector gates 23*a*, 23*b*, 23*c* and 23*d* disposed in the sorting convey path 22*c* are selectively operated to sort the bills in the storing convey paths 22*d*, 22*e* and 22*f* in accordance with the detected denomination. The bills of the first denomination and the damaged bills are stored in the first storage section 16, the bills of the second denomination are stored in the second storage section 17, and the bills of the third denomination are stored in the third storage section 18.

On the other hand, the bills discriminated to be counterfeit by the discrimination section 20 are selected by the selector gate 23*a* to be conveyed along the branched convey path 22*l*. The branched bills are temporarily stacked in the temporary stacking section 21 through the branched convey path 22*l*. In this case, the bills P stacked in the temporary stacking section 21 are aligned to allow simultaneous dispensing of the bills by means of an impeller 25.

When the bill presence/absence sensor 26 detects that no more bills are left in the bill receiving/dispensing port 4, the counterfeit bills are conveyed from the temporary stacking section 21 to the bill rceiving/dispensing port 4 through the delivering convey path 22*m.* In this case, the leading ends of the bills clamped by the bill receiving/dispensing mechanism 15 extend outward from the bill receiving/dispensing port 4. Therefore, the customer can easily remove the bills from the port 4 at once.

Figure 3B:
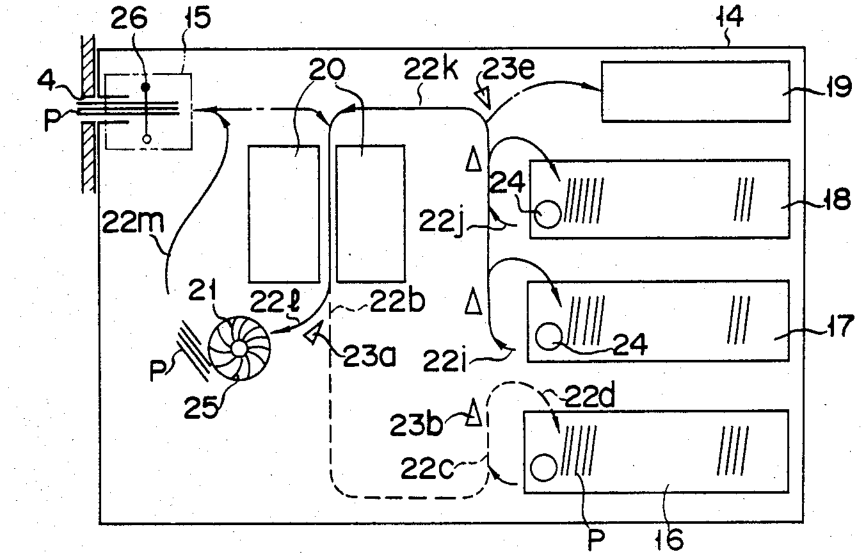
FIG. 3B is a side view showing a bill flow when a withdrawal is made.

The flow of bills in the withdrawal transaction mode will be described with reference to FIG. 3B. When the customer specifies the denominations (i.e., third and second denominations), the bills of the third denomination are sequentially dispensed from the third storage section 18 through the dispensing mechanism 24 one by one. Subsequently, the bills of the second denomination are sequentially dispensed from the second storage section 17 through the dispensing mechanism 24. The bills are conveyed to the storing convey path 22*c* respectively through the dispensing convey paths 22*j* and 22*i.* The bills are conveyed straight along the sorting convey path 22*c* and are transferred to the central convey path 22*b* through the communicating convey path 22*k.* The bills are then discriminated by the discrimination section 20 for any skew or overlaying (double sheet). As a result, the bills are detected to be "fit for dispensing" or "unfit for dispensing".

The bills discriminated to be "fit for dispensing" are gated by the selector gate 23*a* and are fed along the branched convey path 22*l,* as indicated by the solid arrow. The bills are then stacked in the temporary stacking section 21. When all the bills are stacked in the temporary stacking section 21, the bills are collectively dispensed from the bill receiving/dispensing port 4 through the dispensing convey path 22*m.*

However, the bills discriminated to be "unfit for dispensing" (bills subjected to skew detection or double sheet detection) are not gated by the selector gate 23*a* but are conveyed straight along the central convey path 22*b.* The bills are transferred from the central convey path 22*b* to the sorting convey path 22*c.* The bills are then gated by the selector gate 23*b* and are conveyed along the storing convey path 22*d,* so that the bills are stored in the first storage section 16.

Figure 3C:
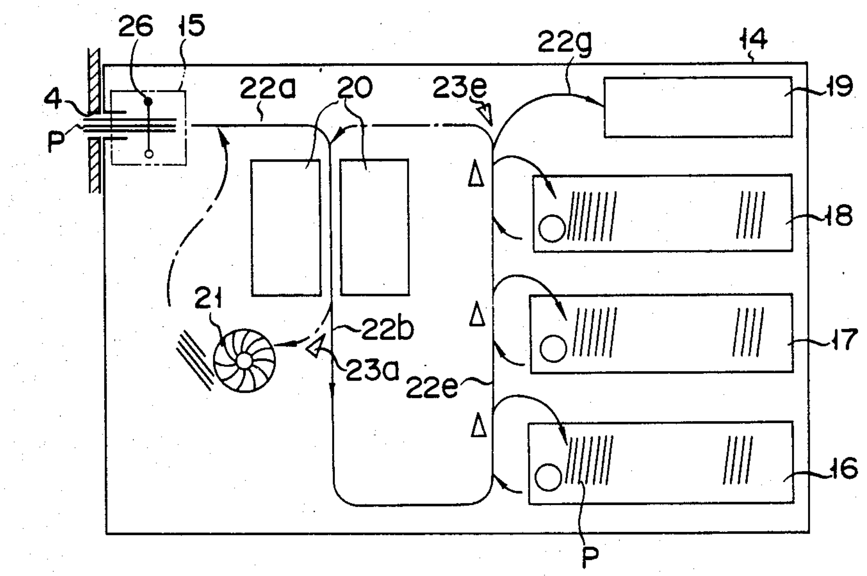
FIG. 3C is a side view showing a bill flow when bills are recovered after a customer forgets to remove the dispensed bills.

When the customer forgets to take out the bills P extending outward from the bill receiving/dispensing port 4 in the deposit or withdrawal transaction mode, as shown in FIG. 3C, the bills are recovered in the recovered bill compartment 19 through the take-in convey path 22*a,* the central convey path 22*b,* the sorting convey path 22*c* and the storing convey path 22*g.*

Figure 4:
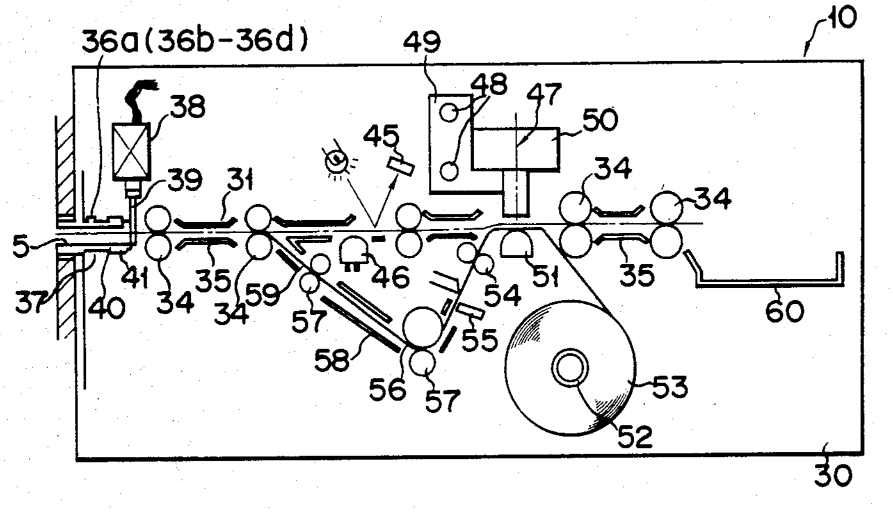
FIG. 4 is a side view schematically showing the configuration of a card/passbook unit.
Figure 5:
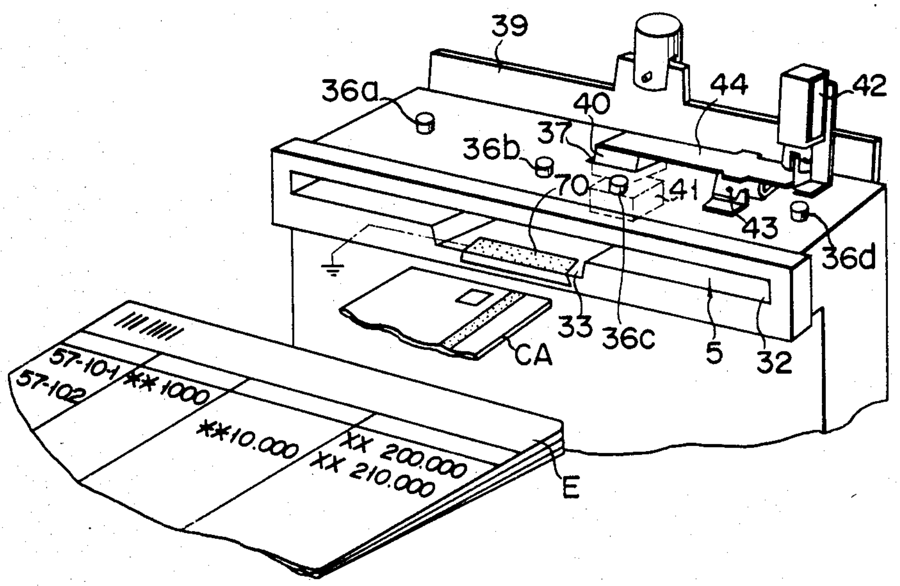
FIG. 5 is a perspective view showing a card/passbook insertion/dispensing port section.

The configuration of the card/passbook unit 10 for processing an IC memory card CA or a magnetic passbook (to be referred to as a passbook hereinafter) E will be described with reference to FIGS. 4 and 5.

A card/passbook unit 10 has a housing 30 which has an opening opposing the card/passbook receiving/dispensing port 5. A convey path 31 extending substantially straight from the card/passbook receiving/dispensing port 5 is formed in the housing 30. The card/passbook receiving/dispensing port 5 has an opening 32 having substantially the same width as that of the passbook E and a groove 33 which is formed in the vicinity of the opening 32 and which has the same width as that of the IC memory card CA. The convey path 31 comprises a plurality of roller pairs 34 and a plurality of guide plate pairs 35.

Optical sensors 36*a* to 35*d,* a card reader 37 for reading information from the IC memory card CA and a shutter 39 are arranged, at one end portion (the card/passbook receiving/dispensing port side) of the convey path 31, along the insertion direction of the card and the passbook, in the order named. The card reader 37 has a contact portion 40 formed at the upper surface side of the convey path 31, and a support 41 disposed at the lower surface side of the convey path 31 to receive a contact pressure. The contact portion 40 is mounted on a support lever 44 which pivots about a pin 43 by means of a solenoid 42.

A reflecting sensor 45 for detecting a page mark or printed line of the passbook E, and a magnetic head 46 for reading magnetic information from a magnetic strip on the passbook E are disposed behind the shutter 39, i.e., in the intermediate portion of the convey path 31.

A printer 47 is disposed behind the magnetic head 46. The printer 47 has a printing head 50 which is mounted on a carriage 49 guided along a pair of guide shafts 48 to reciprocate along a direction perpendicular to the convey path 31, and an anvil 51 disposed along the feed direction of the printing head 50. A leading portion of rolled paper 53 mounted on a reel 52 is placed on the anvil 51. The distal end of the leading portion of the rolled paper 53 is clamped between a pair of feed rollers 54 disposed at the lower surface side of the convey path 31. The rolled paper 53 is fed upon rotation of the feed rollers 54. A cutter 55 is disposed in the vinicity of a portion of the feed rollers 54 which is located in the delivery side of rolled paper 53. The rolled paper 53 is cut by the cutter 55. The cut sheet, i.e., a receipt 56 is conveyed, to a position behind a portion of the convey path 31 at which the shutter is located, through a receipt transfer path 59 which comprises a pair of convey rollers 57 and a pair of guide plates 58. The conveyed receipt is dispensed from the card/passbook receiving/dispensing port 5.

A recovery box 60 is disposed at the end of the convey path 32, away from the card/passbook receiving/dispensing port 5, to store IC memory cards CA, passbooks E, and receipts 56 which are not removed by the customers.

Figure 6:
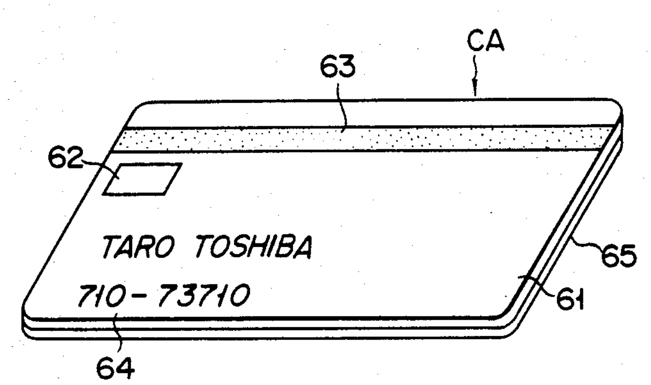
FIG. 6 is a perspective view showing an IC memory card as a transaction medium.
Figure 7:
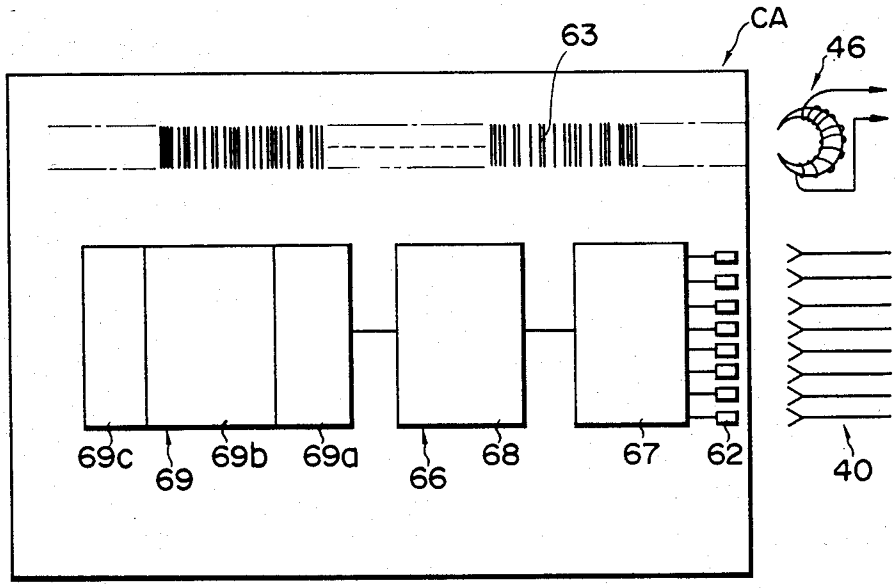
FIG. 7 is a plan view showing the basic representation of an IC memory card.

The IC memory card CA is arranged as shown in FIGS. 6 and 7. FIG. 6 shows the outer appearance of the IC memory card CA. Reference numeral 61 denotes a surface layer. The surface layer 61 has an IC memory contact portion 62, a magnetic stripe 63, and an embossed portion 64 which represents characters by projections. The IC memory card CA has the same outer appearance as the conventional magnetic card. A conductive coating is formed on a lower surface layer 65. FIG. 7 shows a basic representation of the IC memory card CA. An account number, a confidential number and so on are recorded in the magnetic strip 63. The information is read out by the magnetic head 46 from the magnetic strip 63. The IC memory card CA has an IC memory 66, an input/output control section 67, a central control section 68 and a memory section 69. The sections 66, 67, 68 and 69 comprise highly integrated LSIs, respectively. The memory section 69 comprises a program memory 69*a* for storing the control sequence, a random access memory 69*b* from or to which data can be freely accessed, and a key data memory 69*c* which is protected against data read and data updating.

The account number and the first confidential number are recorded on the IC memory card CA. The second confidential number in addition to the account number and the first confidential number is stored in the IC memory 66.

When key input data correponds to the first confidential number data recorded on the magnetic strip 63, a withdrawal amount transaction is limited to a predetermined amount. However, when the second confidential number which is unknown to a third party and stored in the IC memory 66 is keyed in, such a transaction limitation is not imposed.

When the IC memory card CA is inserted in the card/passbook receiving/dispensing port 5, the optical sensors 36*b* and 36*c* generate "dark" signals, respectively. In this case, the shutter 39 is kept closed. When the leading end of the IC memory card CA abuts against the shutter 39, the alignment of the IC memory card CA is performed. When the solenoid 42 is energized, the support lever 44 pivots about the pin 43. Therefore, the contact portion 40 mounted at the distal end of the support lever 44 is brought into tight contact with the contact portion 62 of the IC memory card CA. In this manner, signal exchange is performed between the IC memory card CA and the card/passbook unit 10.

When the passbook E is inserted, all the optical sensors 36*a* to 36*d* generate the "dark" signals. In this case, the shutter 39 is opened, and the drive system of the convey path 31 is actuated. The passbook E is received, and the page mark and latest printed line number of the passbook E are read by the reflecting sensor 45. Thereafter, a predetermined content is printed by the printer 47 on the passbook E.

A grounded conductor 70 is mounted in the groove 33 of the card/passbook receiving/dispensing port 5. The conductor 70 can be brought into contact with the conductor coated on the lower surface layer 65 of the IC memory card CA, so that static electricity which influences the IC memory 66, can be removed.

The configuration of the display/input unit 11 will be described with reference to FIGS. 8 to 10.

Figure 8:
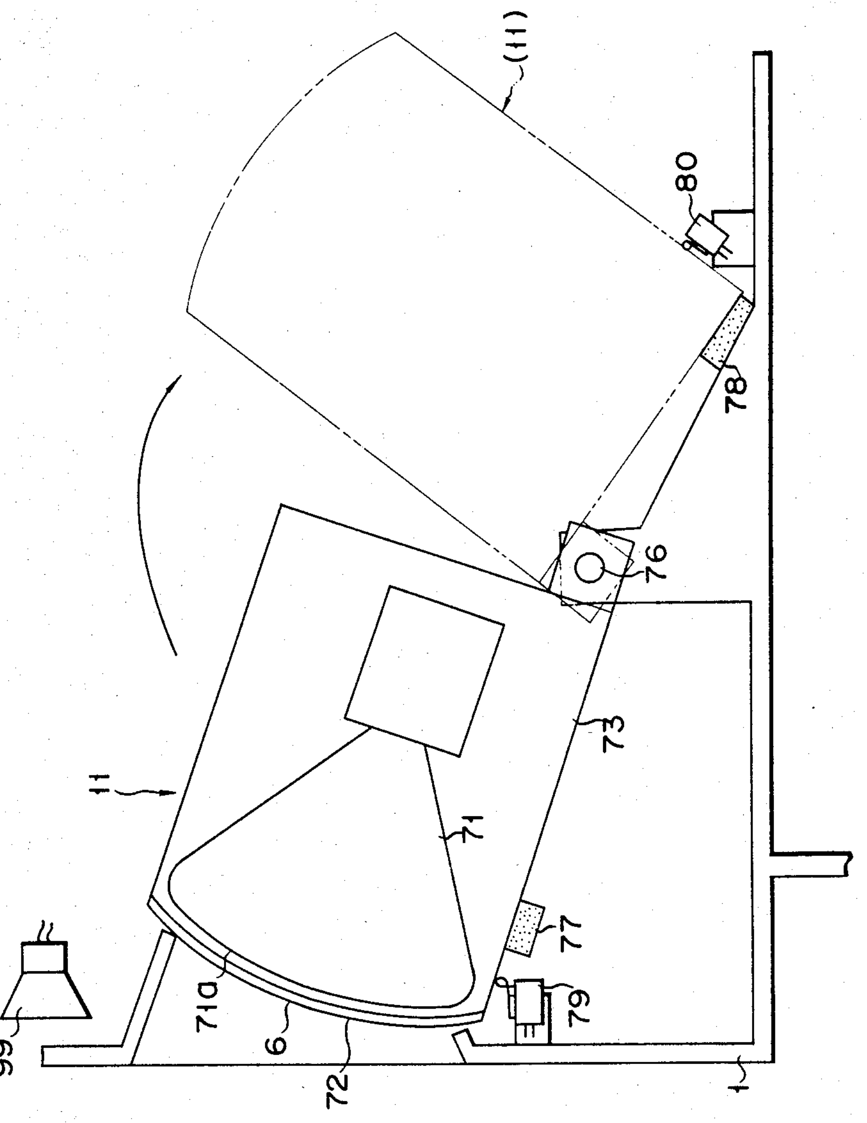
FIG. 8 is a side view schematically showing the configuration of a display/input unit.
Figure 9:
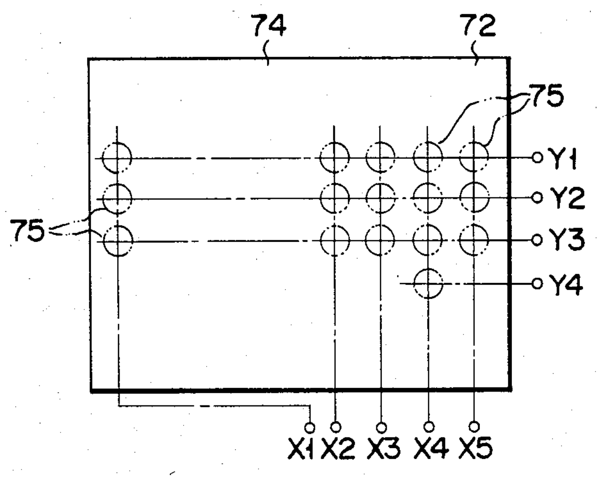
FIG. 9 is a front view schematically showing the configuration of a transparent keyboard.

The display/input unit 11 has a CRT 71 as an operation guide means, and a transparent keyboard 72 as an operation input means arranged to cover a screen 71*a* of the CRT 71, as shown in FIG. 8. The CRT 71 and the transparent keyboard 72 are built into a casing 73. As shown in FIG. 9, the transparent keyboard 72 is arranged such that transparent electrodes 75 are embedded in a transparent board 74. The transparent electrodes 75 constitute a matrix circuit represented by X1 to X5 and Y1 to Y4. The customer depresses one of the intersections of the matrix circuit to generate a corresponding input. The transparent board 74 has substantially the same radius of curvature as that of the screen 71*a*, thereby preventing parallax.

The display/input unit 11 is pivotally supported by a pin 76, so that the unit 11 can be selectively accessed at the front or rear surface of the main body 1. The display/input unit 11 is stopped at two positions when it abuts against the stoppers 77 and 78, as indicated by the solid line and the alternate long and two short dashed line of FIG. 8. Reference numerals 79 and 80 denote switches for detecting positions of the display/input unit 11. When the switch 79 is turned on, the apparatus is set in the transaction mode. However, when the switch 80 is turned on, the apparatus is set in the bank personnel mode.

Figure 10:
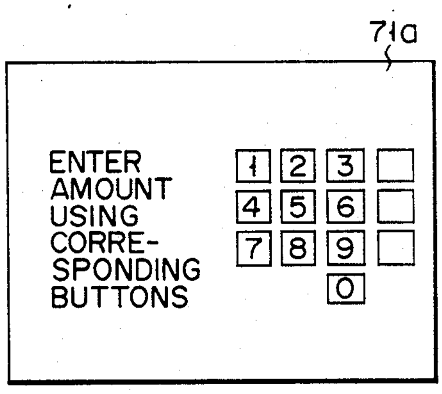
FIG. 10 is a front view showing a display state of a CRT.

When the screen 71*a* of the CRT 71 is illustrated in a manner as shown in FIG. 10, the transparent keyboard 72 serves as ten keys. When the screen display changes, the transparent keyboard 72 serves as function keys.

Figure 11:
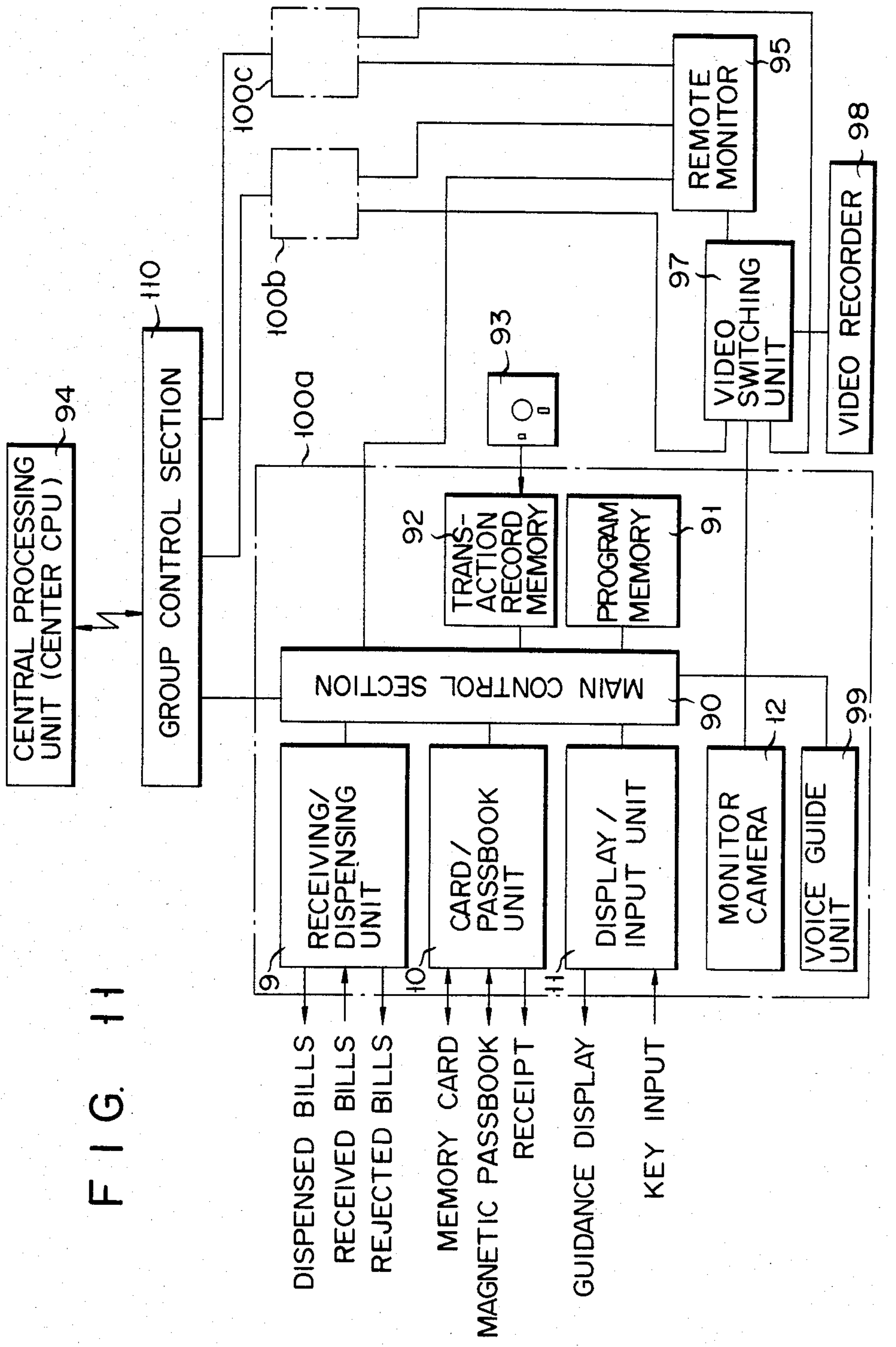
FIG. 11 is a block diagram showing the arrangement of a control.

The input/output section of the automatic bank note transaction apparatus 100*a* is constituted by the receiving/dispensing unit 9, the card/passbook unit 10, the display/input unit 11, and a voice guide unit 99. As shown in FIG. 11, they are controlled by a program sequence stored in a program memory 91 under the control of a main control section 90. Referring to FIG. 11, reference numeral 92 denotes a transaction record memory. The transaction records stored in the memory 92 which are conventionally printed on the journal are stored in a floppy disk 93. The main control section 90 is connected to a central processing unit (to be referred to as a center CPU hereinafter) 94 of a bank center through a transmission line. Therefore, the automatic bank note transmission apparatus serves as a terminal device in the on-line automatic banking service system. The automatic bank note transaction system has a remote monitor 95. The remote monitor 95 is connected to all the automatic bank note transaction apparatuses 100*a*, 100*b* and 100 *c* so as to monitor these apparatuses. A video signal from the monitor camera 12 as the photographing means is supplied to the remote monitor 95 through a video switching unit 97 to display the monitoring state, or is supplied to a video recorder 98 for future reference.

The monitoring mode in terms of display and recording modes wherein the image is displayed on the remote monitor 95 or the video signal is recorded by the video recorder 98 is switched such that video recording is performed only in the customer's transaction mode, thereby minimizing the data acquisition quantity and decreasing the recording cost. At the same time, the video image is utilized when burglary occurs.

A partial examination/replenishing system which controls the automatic bank note transaction apparatuses 100*a*, 100*b* and 100*c* having the construction described above and dealt as a group is illustrated in FIG. 12. Assume that one bank branch has three automatic bank note transaction apparatus 100*a*, 100*b* and 100*c* (as machine A, machine B and machine C). The three apparatuses 100*a*, 100*b* and 100*c* communicate with the center CPU 94 through a group control section 110. When the customer performs a transaction and one of the apparatuses 100*a*, 100*b* and 100*c* communicates with the center CPU 94, data such as withdrawal amount data, dispensing bill number data, deposit amount data, deposit bill number data, the rejection frequency data and denomination data are supplied from the automatic bank note transaction apparatus 100*a*, 100*b* or 100*c* to the group control section 110. A remaining bill monitor 111 is connected to the group control section 110. The group control section 110 causes indicators to turn on for an "end" level, an "replenishment required" level, a "replenishable" level and a "full" level of the bills of the second and third denominations. The "end" level indicates that since only a very few bills are left, bill dispensing cannot be performed. The "replenishment required" level indicates that bills must be replenished since only a small number of bills is left. The "replenishable" level indicates that a considerable number of bills are left, so these bills can be used for replenishment of any other apparatus of the group. The "full" level indicates that the bill storage sections are full with the corresponding bills and no more deposits can be accepted.

Figure 12:
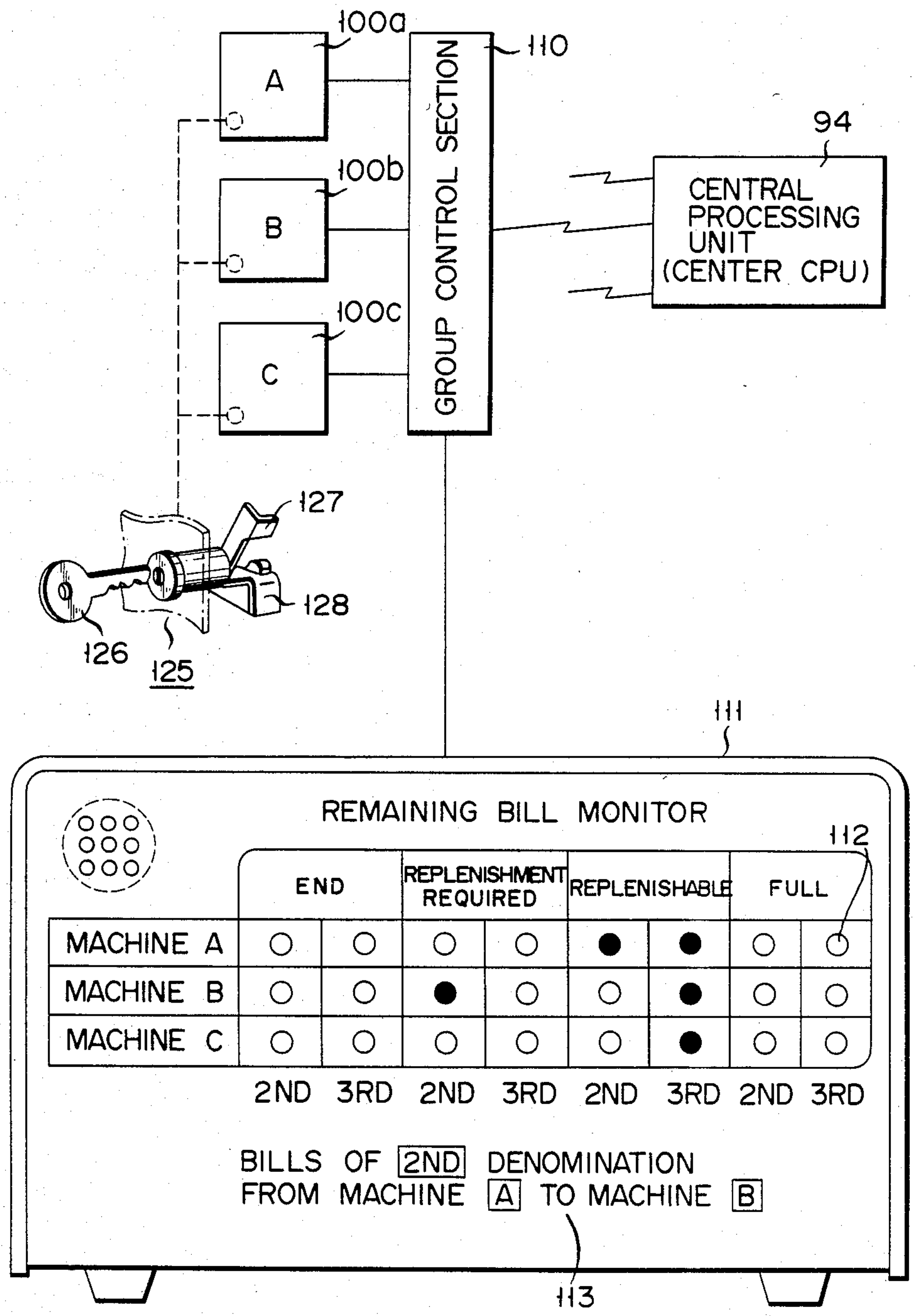
FIG. 12 is a view showing a group control state of the automatic bank note transaction apparatuses.

A black dot in FIG. 12 indicates that an indicator is turned on, and a white dot indicates that an indicator is turned off. When indicator lamps 112 flash, the corresponding apparatuses (machines A, B and C) are set in the "replenishable" level. When the indicator lamps 112 are kept on, the corresponding apparatuses are set in the "full" level.

A character display unit 113 is arranged in the lower portion of the remaining bill monitor 111 to indicate which type of bills is to be transferred from which machine to which machine. When the character display unit 113 flashes, it indicates a recommended timing for replenishment; the machines or apparatuses can still dispense/receive bills for some subsequent transactions. However, when the character display unit 113 displays numeric data which is continuously illuminated, a corresponding apparatus cannot perform any subsequent transaction.

Figure 13:
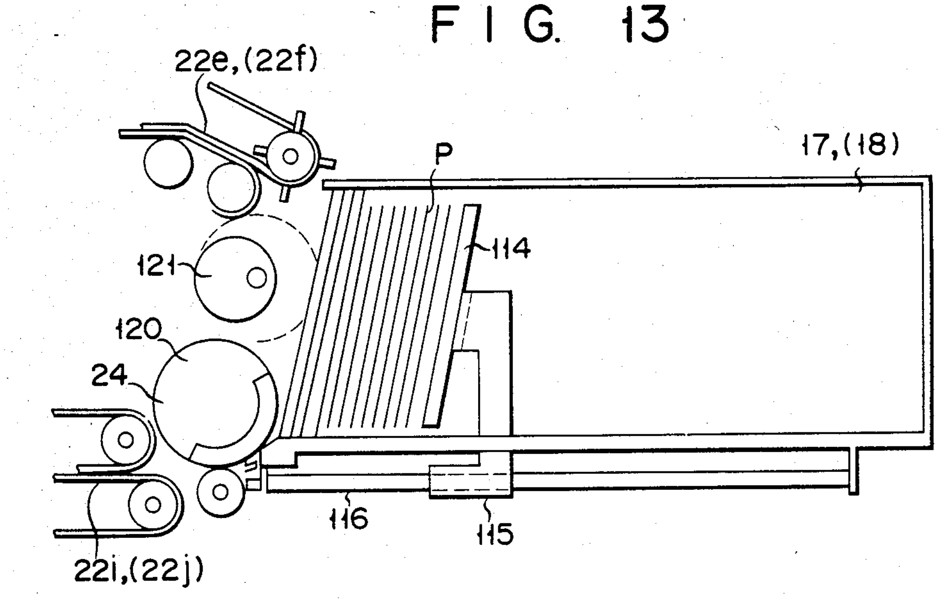
FIG. 13 is a side view schematically showing the configuration of a bill storage section.
Figure 14:
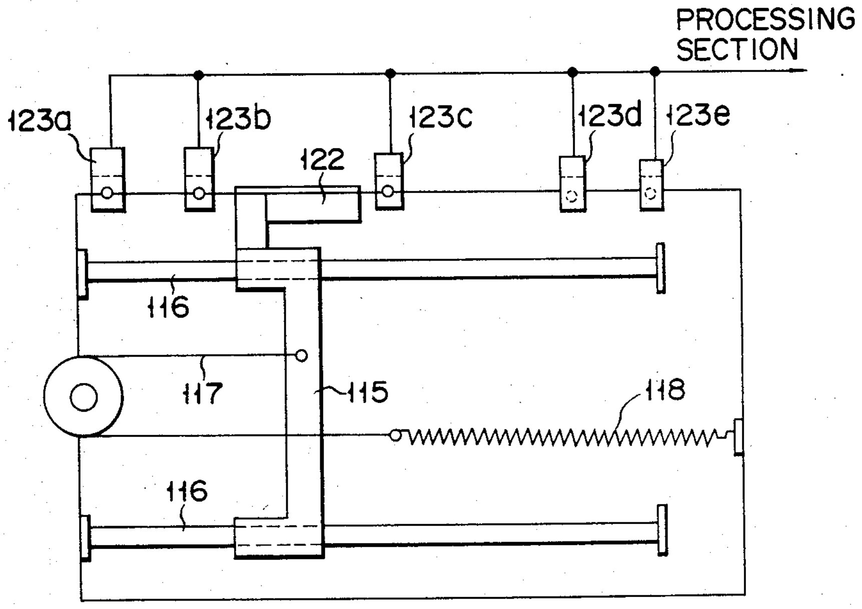
FIG. 14 is a bottom view showing the bill storage section.
Figure 16A:
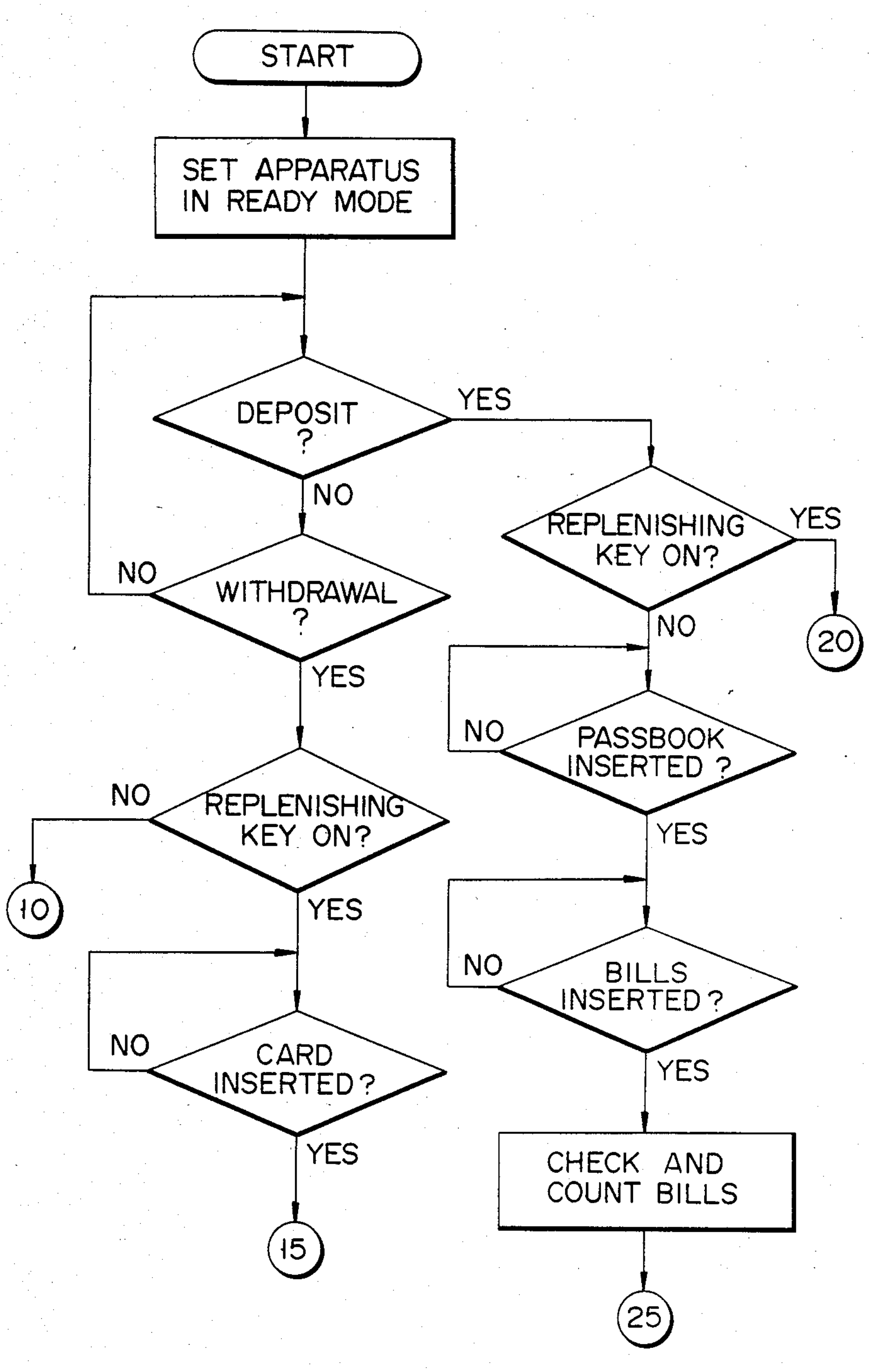
FIGS. 16A to 16D are respectively flow charts for explaining the operation of the automatic bank note transaction apparatus.
Figure 16B:
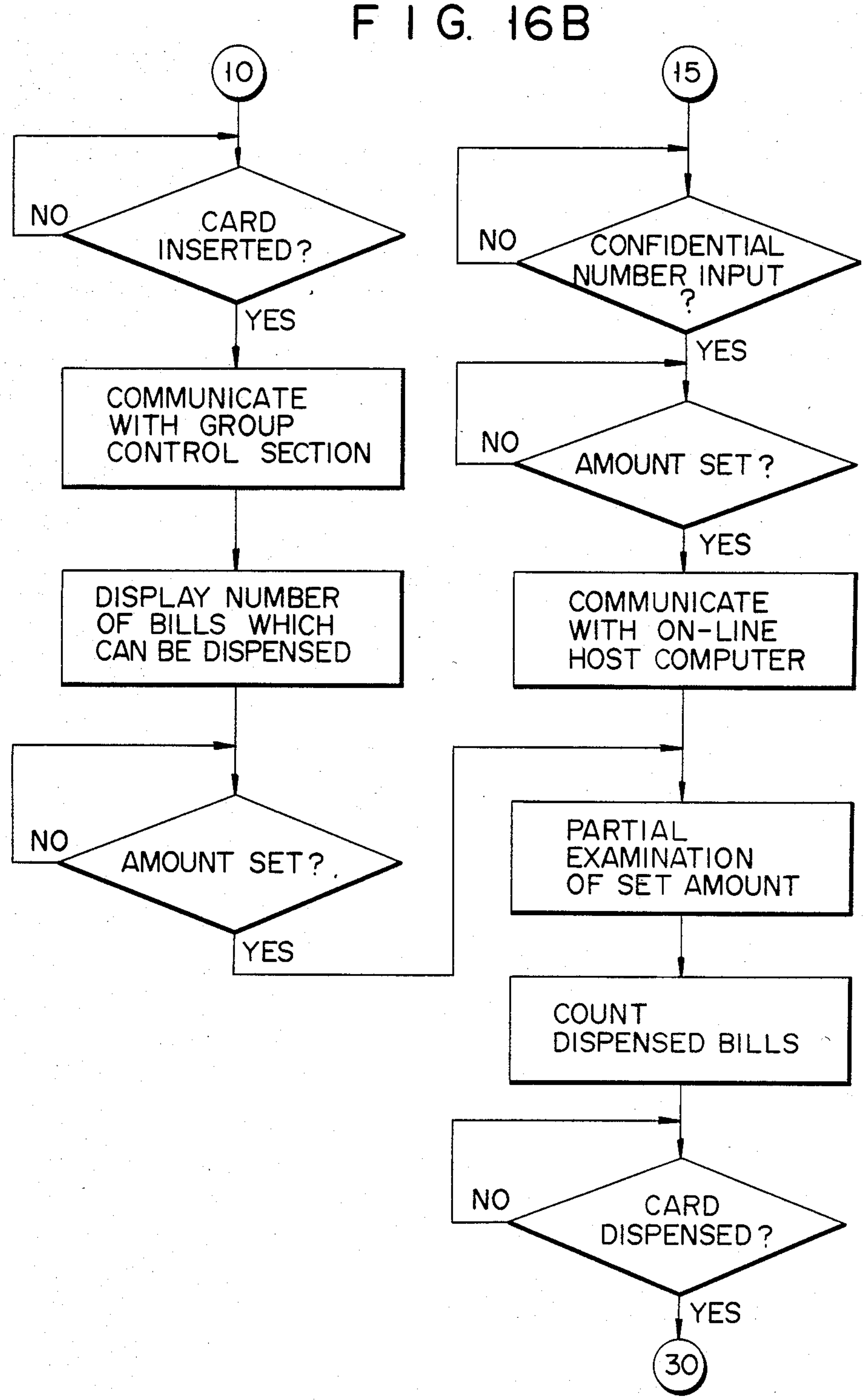
Figure 16C:
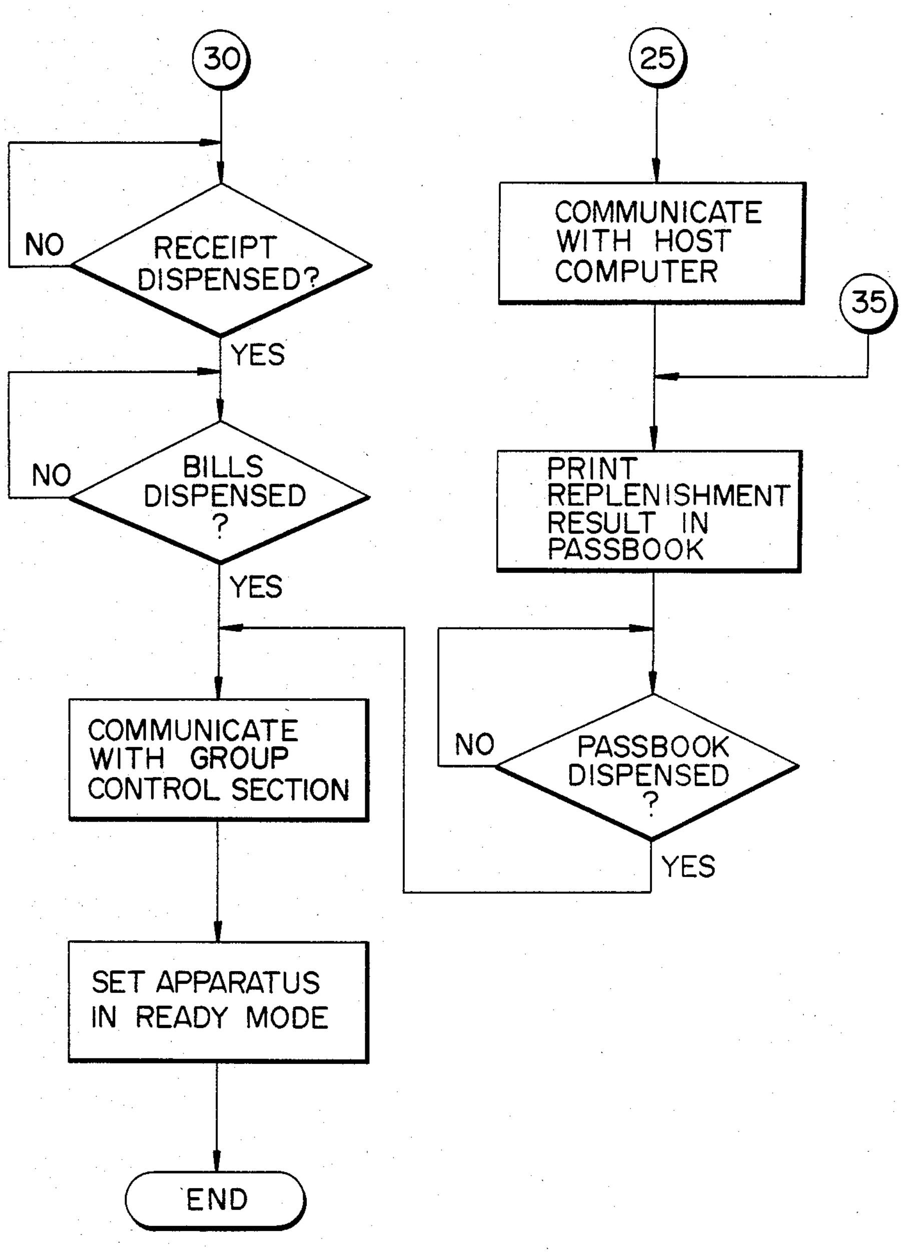
Figure 16D:
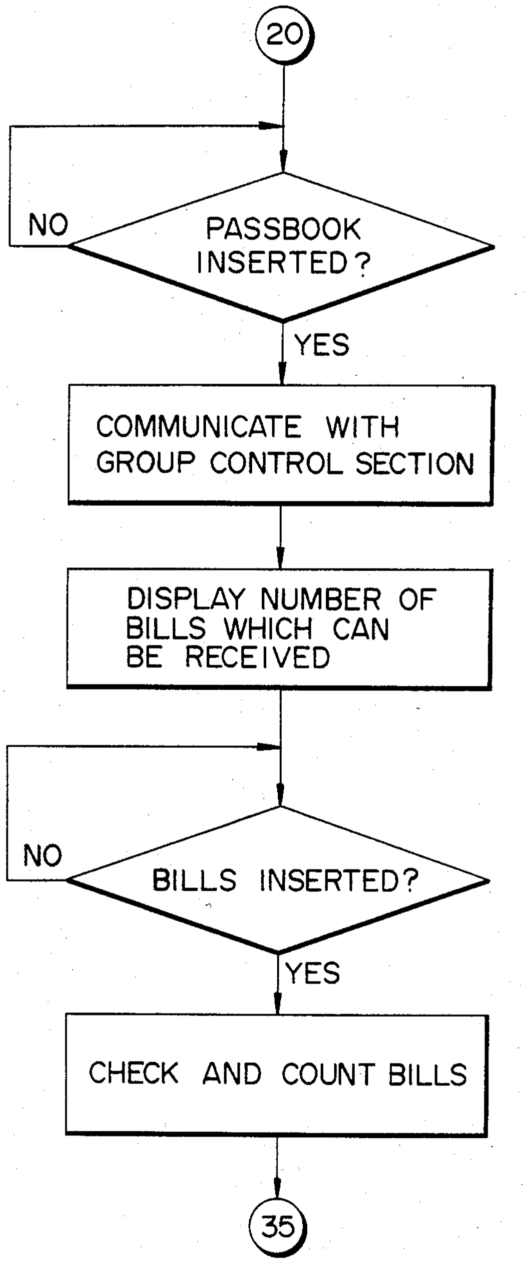

A means for detecting the bills left in the second and third bill storage sections 17 and 18 is illustrated in FIGS. 13 and 14. Since the second and third bill storage sections 17 and 18 have the same construction, only the second bill storage section 17 is illustrated. FIG. 13 is a sectional view of the bill storage section 17, and FIG. 14 is a bottom view thereof.

A backup plate 114 is disposed in the bill storage section 17 to urge a stack of vertically aligned bills against the bill dispensing mechanism 24. The backup plate 114 is supported by a bearing 115 to be slidable with respect to parallel shafts 116 along the bill stacking direction. A spring 118 is connected to a belt 117 to bias the backup plate 114. A pickup roller 120 partially coated with a rubber sheet is mounted at the dispensing mechanism 24. The bills P are sequentially picked up one by one and conveyed along the convey paths 22*i* and 22*j*. On the other hand, when the bills are stored in the bill storage section 17 in the deposit transaction mode, the bills P fed from above through the convey paths 22*e* and 22*f* are inserted in the bill storage section 117 through an eccentric pushin roller 121. A light-shielding member 122 is integrally formed with the backup plate 114. Five optical sensors 123*a* to 123*e* are arranged along the bill stacking direction to generate "dark" signals when light is shielded by the light-shielding member 122. The optical sensors 123*a*, 123*b*, 123*c*, 123*d*, and 123*e* detect the "end" level, the "replenishment required" level, the "replenishable" level, the "near-full" level and the "full" level, respectively. The signals from the sensors 123*a* to 123*e* are supplied to the group control section 110 through the main control section 90.

The group control section 110 supplies to the remaining bill monitor 111 the signals generated from the sensors 123*a* to 123*e*, so that the bill storage conditions of the respective apparatuses are indicated by the indicator lamps. On the other hand, the group control section 110 performs logic operation in accordance with signals generated therein and supplied thereto. When the machine B is set in the "replenishment required" level with respect to the bills of the second denomination and the machine A is set in the "replenishable" level with respect to the bills of the second denomination, a display such as "Second denomination bills from machine A to machine B" is performed.

The group control section 110 has a memory for storing data described above. The basic representation of the memory is illustrated in FIG. 15. The memory addresses are defined by rows and columns. Columns represent the machines A, B and C; and rows represent data of bills left in the machines A, B and C. At row addresses 10 to 12, received or dispensed bills are added or subtracted from the initial amount. The numerical data are "theoretical" amounts of remaining bills. The term "theoretical" is used here in accordance with the following reason. In the bill dispensing mechanism 24, when the bills are dispensed from the bill storage sections 17 and 18 one by one, and some bills are discriminated to be skewed bills and overlaying bills, the apparatus rejects these bills. For this reason, when the rejected bills are detected, the amount of bills remaining in the bill storage section 17 or 18 can be smaller than the subtracted value described above. At row addresses 13 to 22, the binary data "0" or "1" is generated from any one of the sensors 123*a* to 123*e* of the bill storage sections of each machine and indicates the remaining bill level. Replenishing bill data from the machine A to the machine B is generated in accordance with this data.

At row addresses 23 to 25, the numeric data indicate the number of times "nondispensible" bills are detected by skew detection and double sheet detection via the discrimination section 20 when the bills are dispensed from the bill dispensing sections 17 and 18 one by one. The replenishing bill data is generated in accordance with the data at row addresses 13 to 22. However, the replenishing bill data can be generated by using the data at row addresses 23 to 25 as follows.

The number data of bills stored in the third and second bill storage sections 18 and 17 are stored in a memory. Every time a transaction is performed, and especially when a deposit transaction is made, the received bills are checked by the discrimination section 20 with respect to the degree of contamination of the bills. A total number of bills discrimated to be fit or authentic bills, and their total amount are calculated. A calculation result is stored in a memory area at row addresses 10 to 12. However, in the withdrawal transaction mode, a total amount and number of bills are calculated and the calculated data are stored in a memory area at row addresses 10 to 12. A value obtained by doubling the rejected bills (since the rejected bills are usually subjected to double sheet detection) is subtracted from the calculation result. The resultant value is given as the remaining bill number. The remaining bill number is compared with the threshold values of the "end", "replenishment required", "replenishable", "near-full" and "full" levels to obtain remaining bill levels. The replenishing bill data are generated in accordance with these remaining bill level data.

At row addresses 25, "personnel holding amount" data is stored in the memory. When personnel remove 100 bills of the second denomination from the machine A and insert them in the machine B, and these bills are rejected due to a certain reason and cannot be inserted in the second bill storage section 17 of the machine B, the personnel hold the bills while they enter the amount at the operation panel of the machine B. The personnel holding amount data is entered to that the personnel will not forget the amount.

The above operation explicitly explains the replenishing data output on the assumption that the personnel know the number of bills left in the bill storage sections 17 and 18.

A partial examination/replenishing operation in accordance with the replenishing data will be described with reference to flow charts in FIGS. 16A to 16D.

The personnel have the IC memory cards CA and the passbooks E which respectively correspond to the machines A, B and C. Each IC memory card CA is recorded with a signal which confines the transactions to "replenishing".

In the flow chart shown in FIGS. 16A to 16D, when a replenishing key switch 125 is not turned on, the normal transaction state is set in either the deposit or withdrawal transaction mode. When the bank personnel insert a key 126 in a slit of the replenishing key switch 125 and turns it therein, a lever 127 urges a switch 128, and a replenishing signal is generated. The replenishing key switch 125 does not generate the replenishing signal if a key other than the key 126 is inserted.

When the personnel judge that bills are replenished from the machine A to the machine B in accordance with the display of the remaining bill monitor 111, the bank personnel specify the withdrawal transaction mode at the keyboard so as to dispense bills from the machine A. When the replenishing key switch 125 is turned on through the key 126, the machine A is set in the partial examination mode in response to the replenishing signal. When the card CA is inserted, the main control section 90 of the machine A communicates with the group control section 110, so that the type of denomination and number of bills to be transferred to the machine B are displayed on the CRT 71 of the machine A. When the personnel key in the amount in accordance with the display of the machine A, the bills P are dispensed from the bill receiving/dispensing port 4. Thereafter, the IC memory card CA is dispensed from the machine A, and a receipt 56 showing the amount of dispensed bills is issued. After the bills are dispensed, the main control section 90 of the machine A communicates with the group control section 110 again and transmits data of partial examination bills dispensed from the bill storage sections 17 and 18.

The personnel carry the partial examination bills and enter the bills in the machine B. When the replenishing key switch 125 is turned on by the key 126, the machine B is set in the replenishing mode. Thereafter, the personnel insert the passbook E in the card/passbook receiving/dispensing port 5 in the same manner as in the normal deposit transaction mode, and enter the bills P. The number of bills and the type of denominations are printed on the passbook E. The passbook E is dispensed from the card/passbook receiving/dispensing port 5.

In this manner, the automatic bank note transaction apparatuses 100*a*, 100*b* and 100*c* have the same receiving/dispensing mechanism, so that the received bills can be used as bills to be dispensed. In addition, the bills to be dispensed can be replenished without interrupting the normal transactions. Therefore, unlike the conventional apparatus which is set in the "off" mode while the bills are replenished and which can be used after replenishment, the apparatus of the present invention does not require such an idle time. The bills can be replenished even while a normal transaction is performed by a customer. In addition, the transaction records can be printed on the passbook and the receipt 56, thereby simplifying the replenishing system.

The present invention is not limited to the particular embodiment described above. Various changes and modifications may be made within the spirit and scope of the present invention. In the embodiment described above, the uppermost storage section is used as the recovered bill compartment 19. The bills are not dispensed from the recovered bill compartment 19. In addition, bill receiving/dispensing must be performed through the bill receiving/dispensing port 4.

However, as in another embodiment to be described below, partial examination/replenishment can be performed through a specific storage chamber without intermediacy use of the bill receiving/dispensing port 4.

An automatic bank note transaction apparatus used in an automatic bank note transaction system according to another embodiment of the present invention will be described with reference to FIGS. 17 to 20.

Figure 17:
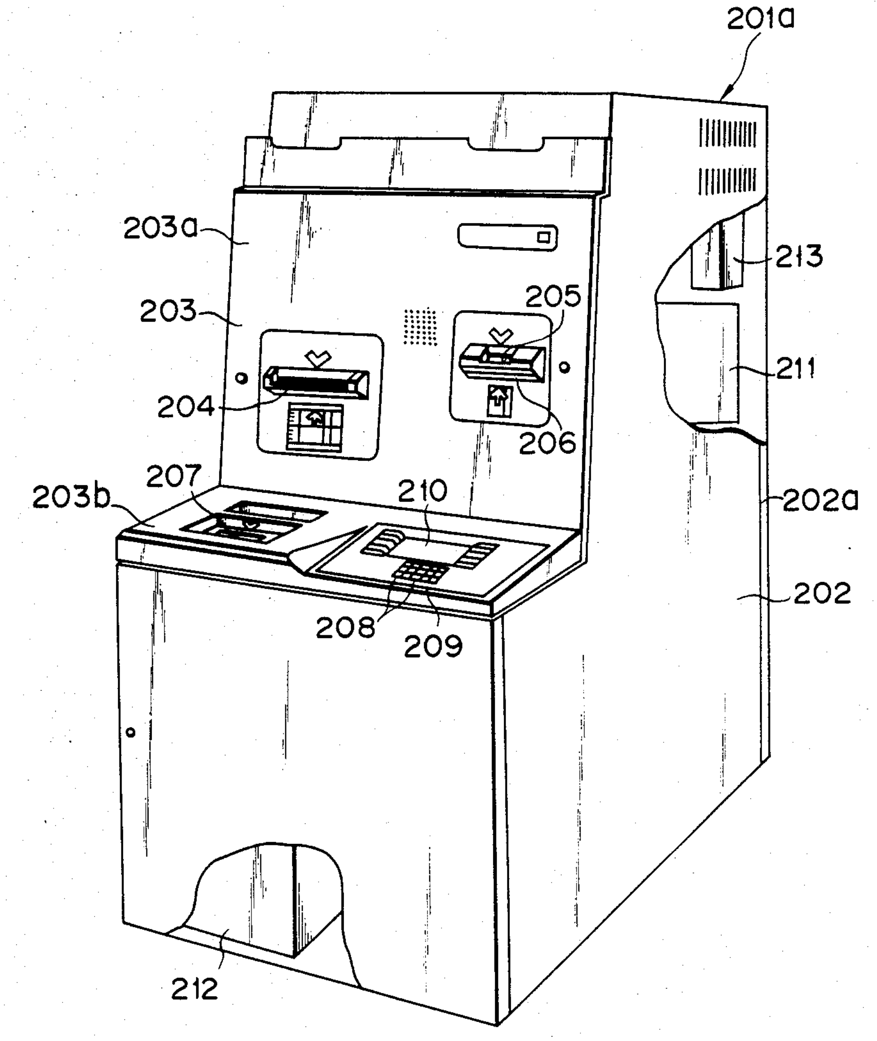
FIG. 17 is a partially cutaway perspective view of an automatic bank note transaction apparatus used in another embodiment of an automatic bank note transaction system according to the present invention.

FIG. 17 shows a depositing/dispensing apparatus 201*a* of an automatic bill circulating system as another embodiment of the automatic bank note transaction apparatus according to the present invention. The apparatus 201*a* has a main body 202, and an operation panel 203 is provided at the customer side of the main body 202. A passbook insertion port 204, a card insertion port 205 and a receipt dispensing port 206 are formed in a vertical panel portion 203*a* of the operation panel 203. A bill receiving/dispensing port (bill port) 207 which serves as both a bill inlet port and a bill outlet port, an operation section 209 having a plurality of operation buttons 208, and an instruction display section (i.e., CRT display unit) 210 are provided in a horizontal panel portion 203*b* of the operation panel 203.

A passbook reader/printer (not shown in FIG. 17) and a card/receipt processing unit 211 are arranged in the main body 202. The passbook reader/printer reads magnetic information on a passbook received through the passbook insertion port 204, records the read magnetic information, and prints the transaction content on the passbook. The card/receipt processing unit 211 deals with a magnetic card inserted thrugh the card insertion port 205, produces a receipt and dispenses it through the receipt dispensing port 206, and prepares a journal duplicate. The main body 202 also contains a bill receiving/dispensing mechanism 212 for dispensing received bills, and recovering dispensed bills which are accidentally left at the bill receiving/dispensing port 207, and an internal monitor unit 213 for loading the bills and discriminating them.

The construction of the bill receiving/dispensing mechanism 212 will be described with reference to FIGS. 18A and 18B.

Figure 18A:
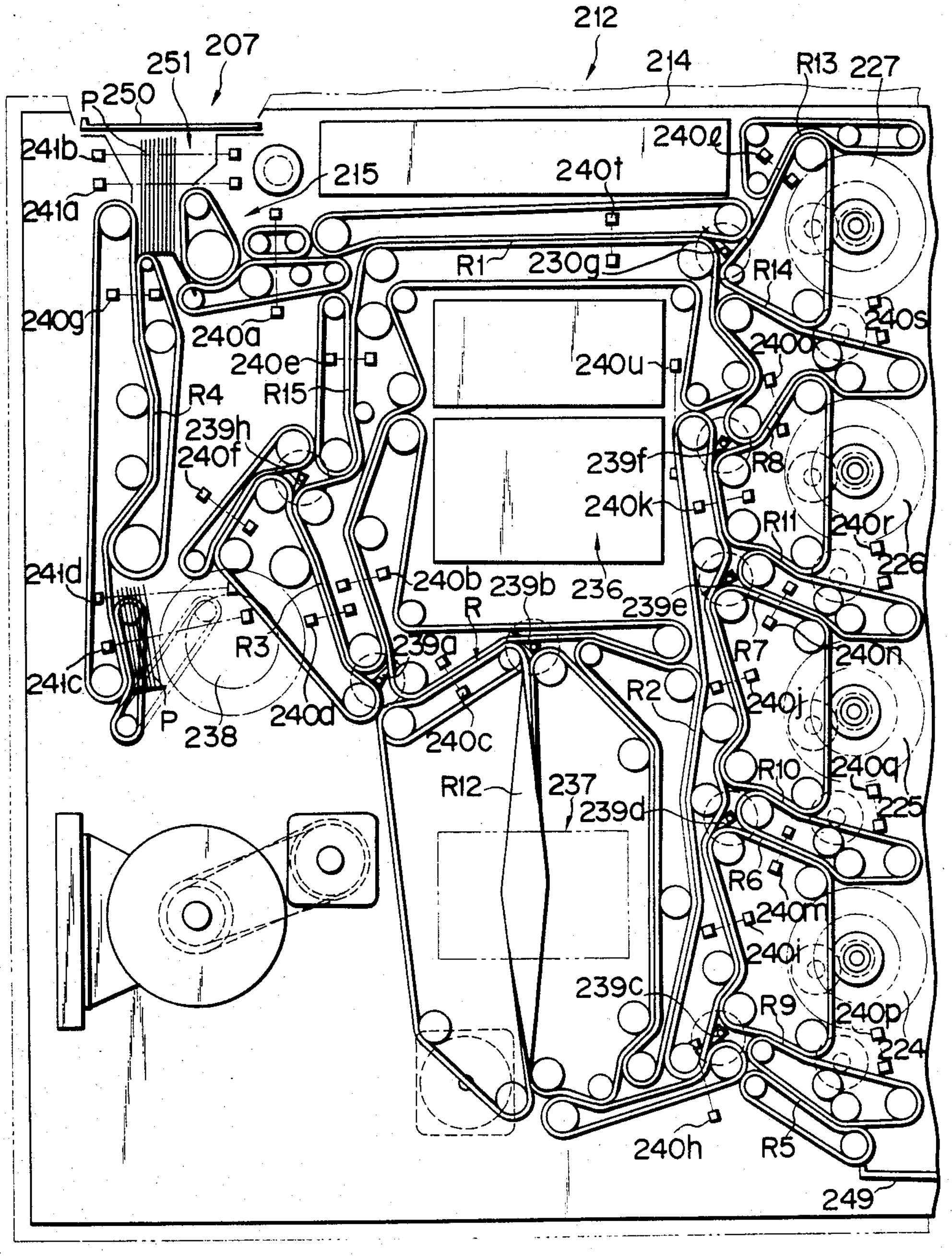
FIGS. 18A and 18B are longitudinal sectional views schematically showing left and right portions of a bill receiving/dispensing mechanism of the apparatus shown in FIG. 17, respectively.
Figure 18B:
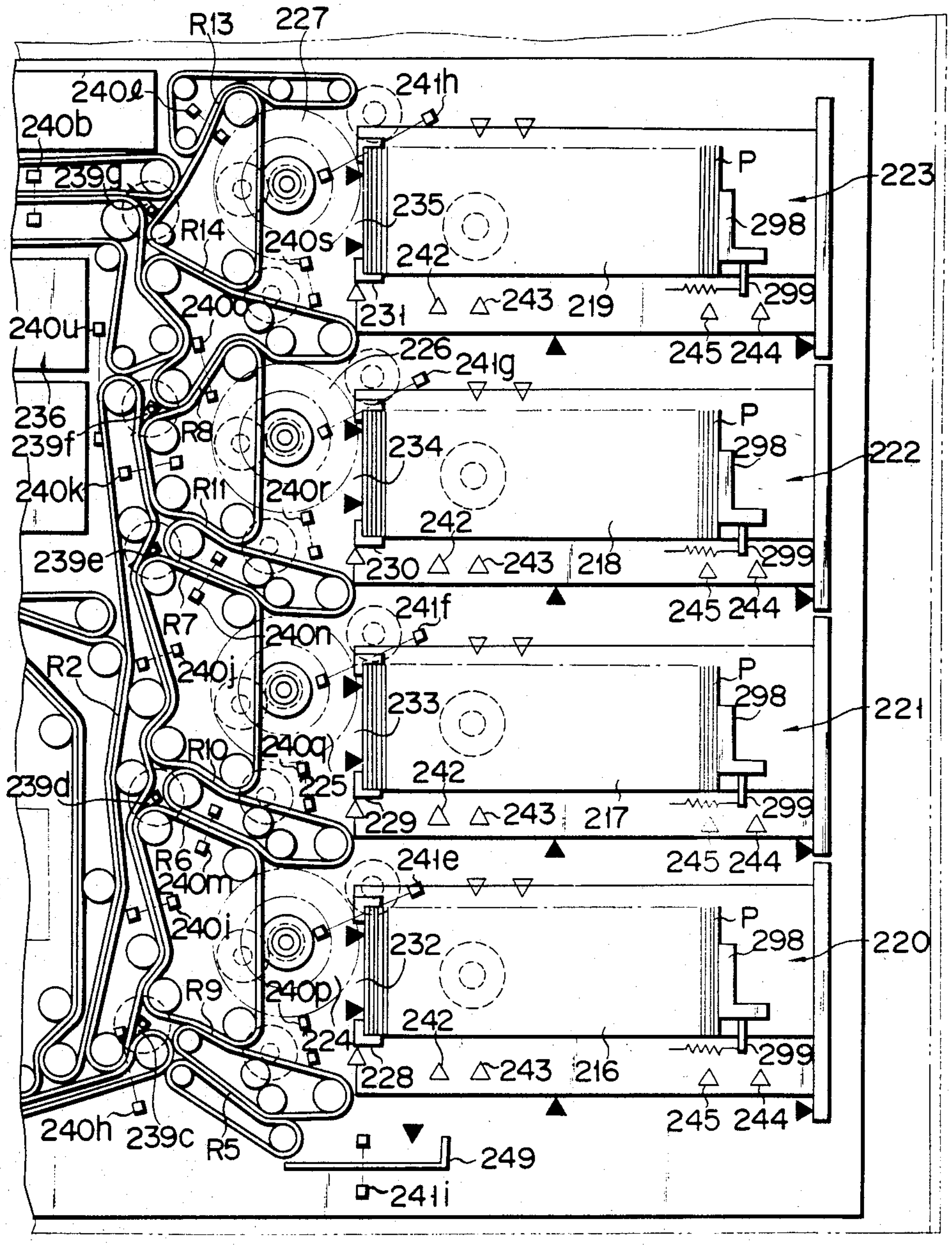

Referring to FIGS. 18A and 18B, reference numeral 214 denotes a housing of the bill receiving/dispensing mechanism 212. A bill receiving/dispensing unit 215 is disposed in the upper portion of the front side (customer side) of the housing 214 so as to oppose the bill receiving/dispensing port 207. First, second, third and fourth bill cassettes 216, 217, 218 and 219 are vertically disposed from the bottom to the top of the rear side (bank side) of the housing 214. The first to fourth bill cassettes 216 to 219 constitute a first storage section 220 as an improper bill storage section for storing bills of a first denomination (i.e., $50, 10 or DM50) which are unfit for dispensation and rejected bills, a second storage section 221 for storing bills of a second denomination (i.e., $10, Σ5 or DM10), a third storage section 222 for storing bills of a third denomination (i.e., $100, Σ20 or DM100), and a fourth storage section (recovery compartment/loading compartment) 223 for storing recovered and loading bills, respectively. Each of the first to fourth bill cassettes 216 to 219 can be pulled out from the main body 202 by opening a rear door 202*a* disposed at the rear side (bank side) of the main body 202 of the depositing/dispensing apparatus 201*a*.

First, second, third and fourth bill stacking/dispensing units 224, 225, 226 and 227 are vertically disposed at substantially the center along the front-to-rear direction (horizontal direction in the drawings) of the housing 214 so as to respectively correspond to outlet ports of the bill storage sections 220, 221, 222 and 223. Separator mechanisms 228, 229, 230 and 231 acting as partitioning means for distinguishing the present transaction from the previous transaction are disposed in the bill storage sections 220, 221, 222 and 223, respectively. Temporary storage sections 232, 233, 234 and 235 are formed between the mechanism 228 and the unit 224, between the mechanism 229 and the unit 225, between the mechanism 230 and the unit 226, and between the mechanism 231 and the unit 227, respectively. A discrimination section 236 is disposed in the front portion of the housing 214 about centrally along the vertical direction thereof. A reverse-presented bill inverting section 237 is disposed below the discrimination section 236, and a temporary stacking section 238 is disposed in front of the discrimination section 236.

Bill convey paths R are formed in the housing 214 so as to convey bills P to the corresponding sections. More particularly, the convey paths R consist of: a first convey path R1 for conveying the bill P from the bill receiving/dispensing unit 215 through the discrimination section 236 to a first branch disposed between the discrimination section 236 and the temporary stacking section 238; a second convey path R2 for conveying the bill P from the first branch to a merge portion of the first convey path R1 which is located at the inlet port of the discrimination section 236; a third convey path R3 for conveying the bill P from the first branch to the temporary stacking section 238; a fourth convey path R4 for conveying the bill P from the temporary stacking section 238 to the bill receiving/dispensing unit 215; a fifth convey path R5 for conveying the bill P from a second branch which is defined at an intermediate portion of the second convey path R2 and located in front of and below the first stacking/dispensing unit 224, to a rejected bill stacking section 249 disposed under the first storage section 220; a sixth convey path R6 for conveying the bill P from a third branch which is defined at an intermediate portion of the second convey path R2 and located in front of and above the first stacking/dispensing unit 224 to the first stacking/dispensing unit 224; a seventh convey path R7 for conveying the bill P from a fourth branch which is defined at an intermediate portion of the second convey path R2 and located in front of and above the second stacking/dispensing unit 225 to the second stacking/dispensing unit 225; an eighth convey path R8 for conveying the bill P from a fifth branch which is defined at an intermediate portion of the second convey path R2 located and in front of and above the third stacking/dispensing unit 226 to the third stacking/dispensing unit 226; a ninth convey path R9 for conveying the bill P from the first stacking/dispensing unit 224 to a merge portion of the second convey path R2 located in front of the first stacking/dispensing unit 224; a tenth convey path R10 for conveying the bill P from the second stacking/dispensing unit 225 to a merge portion of the second convey path R2 located in front of the second stacking/dispensing unit 225; an eleventh path R11 for conveying the bill P from the third stacking/dispensing unit 226 to a merge portion of the second convey path R2 located in front of the third stacking/dispensing unit 226; a twelfth convey path R12 for conveying the bill P from a sixth branch which is defined at an intermediate portion of the second convey path R2 and is located below the discrimination section 236 to a merge portion which is defined at an intermediate portion of the second convey path R2 and which is located in front of the second branch so as to invert the bill by 180 degrees; a thirteenth convey path R13 for conveying the bill P from a seventh branch which is defined at an intermediate portion of the first convey path R1 and located in front of the fourth stacking/dispensing unit 227 to the fourth stacking/dispensing unit 227; a fourteenth convey path R14 for conveying the bill P from the fourth stacking/dispensing unit 227 to a merge portion which is defined at an intermediate portion of the second convey path R2 and which is located in front of and below the fourth stacking/dispensing unit 227; and a fifteenth convey path R15 for conveying the bill P from an eighth branch defined at an intermediate portion of the third convey path R3 to a merge portion defined at an intermediate portion of the first convey path R1.

First to eighth selector gates **239*a*, 239*c*, 239*d*, 239*e*, 239*f*, 239*b*, 239*g* and 239*h* are disposed at the first to eighth branches, respectively. Each selector gate guides the bill P which has reached the corresponding branch to one of the two corresponding convey paths. The selector gates 229*a* to 239*h* are driven by rotary solenoids (not shown), respectively. Bill flow sensors 240*a* to 240*u* are arranged at respective predetermined positions of the convey paths R. Bill presence/absence sensors (residual bill sensors) 241*a* to 241*i* are disposed at respective stacking locations of the bills P. Each of the sensors 240*a* to 240 *u* and 241*a* to 241*i*** comprises a known pair of a light-emitting element and a light-receiving element.

A full-state sensor 244, a near-full-state sensor 245, an empty-state sensor 242 and a near-empty-state sensor 243 are arranged in each of the bill storage sections 220, 221, 222 and 223. Each of these sensors 242, 243, 244 and 245 comprises a microswitch which is turned on/off by a slider 299 fixed to a push plate 298 (to be described later).

Figure 19:
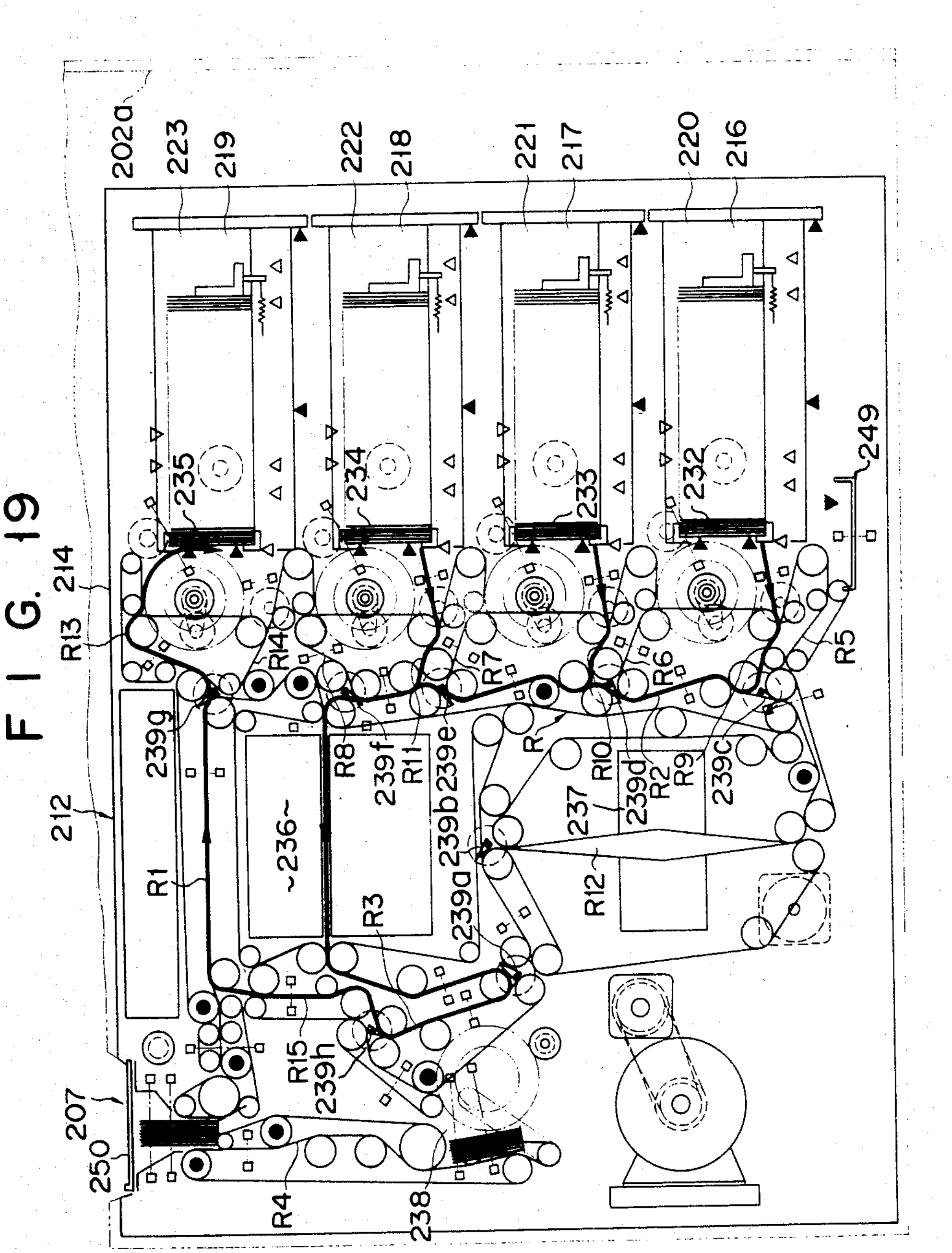
FIG. 19 is a side view showing a bill flow at the time of partial examination.

Partial examination in the utilization of the bills for deposit/withdrawal in service will be described with reference to the bill flow shown in FIG. 19.

When the personnel wish to remove a predetermined number of bills from the second and third storage sections 221 and 222, they set a partial examination bill cassette in the fourth storage section 223. The personnel depress an enquiry button of the internal monitor unit 213 and enter the partial examination bill numbers of the respective denominations at the keyboard. In this case, the main control section 90 stores the partial examination bill number data of the respective denominations in the memory 92. The main control section 90 also checks that the operating mode is neither set in the standby mode nor in the deposit/withdrawal mode. At the same time, the main control section 90 checks that the bills of the third and second denominations are not in the ending or end state in accordance with the number data stored in the memory 92 even if partial examination operation for a predetermined number of bills is performed. When the above conditions are not satisfied, the main control section 90 interrupts the partial examination operation. Otherwise, the main control section 90 causes the CRT display unit 210 to display a message "Partial examination. Pleast wait."

The main control section 90 checks in accordance with a signal from the residual bill sensor **141*a* whether or not any bill is stored in the storage section 223. If there is nothing, the main control section 90 causes an operating state code display of the internal monitor unit 213 to display the first error code, and to generate an alarm. Upon hearing the alarm, the personnel depress a confirmation button of the internal monitor unit 213**.

On the other hand, if there are bank notes, the main control section 90 determines whether or not the residual number data are stored in the memory 92. As a result, if the residual number data are stored in the memory 92, the main control section 90 causes the operating state code display of the internal monitor unit 213 to display a second error code, and to generate an alarm. Upon generation of this alarm, the personnel depress the confirmation button.

However, when the main control section 90 detects that the residual bill number data are not stored, the main control section 90 causes the operating state code display of the internal monitor unit 213 to display the third error code, and to generate an alarm. Upon generation of this alarm, the personnel remove the bill cassette for partial examination from the fourth storage section 223 and the bills from the cassette. Thereafter, the bill cassette for partial examination is set again in the fourth storage section 223.

Upon depression of the confirmation button or resetting of the bill cassette for partial examination, the main control section 90 causes the bill receiving/dispensing mechanism 212 to dispense the bills of the third denomination from the third storage section 222 and to stack them in the temporary storage section 235 in the same manner as in the withdrawal transaction operation.

In this case, the bills dispensed from the third storage section 222 are detected by the bill flow sensor 240*r*, and the detected signal is supplied to the main control section 90 which counts the number of bills. When the dispensed bills are passed through the discrimination section 236, they are subjected to denomination discrimination and the discrimination result is supplied to the main control unit 90. The main control unit 90 causes the counter (not shown) to count the discrimination result. In addition, the bills stacked in the temporary storage section 235 are detected by the bill flow sensor 240*l*, and the detection signals therefrom are supplied to the main control section 90 which counts the number of stacked bills.

When the count (number of bills of the third denomination) of the bill flow sensor 240*l* reaches a predetermined value, the main control section 90 causes the bill receiving/dispensing unit 215 to stop dispensing the bills frm the third storage section 222. Subsequently, the bills of the second denomination are dispensed from the second storage section 221. When the main control section 90 detects that the number of bills of the second denomination conveyed in the temporary storage section 235 has reached a predetermined value, the main control section 90 causes the bill receiving/dispensing mechanism 212 to stop dispensing the bills from the second storage section 221. The bills are then conveyed from the fourth temporary storge section 235 into the fourth storage section 223. In this case, the main control section 90 causes the bill number display of the internal monitor unit 213 to display the numbers of bills of the third and second denominations which are stored in the fourth storage sections 223. At the same time, the main control section 90 causes the printer (not shown) of the card/receipt processing unit 211 to print the partial examination contents (the partial examination bill numbers of the third and second denominations) on a journal. The personnel compare the contents of the journal with the contents of the bill cassette 219.

When the main control section 90 determines that the apparatus 201*a* is set in the standby mode or the bill receiving/dispensing mechanism 212 is operated, or that the bills of the third or second denomination are in the ending or end stage if partial examination is performed, the accumulation data is printed as the enquiry data even if the enquiry button is depressed. Furthermore, the main control section 90 causes the printer to print in the journal data representing the incapability of partial examination.

Partial examination can be performed when a given cassette is filled with the bills in the same manner as described above. When the bills are removed to the fourth storage section 223 from the cassette which is filled with the bills, the full-state can be automatically released, so that the apparatus 201*a* can continuously receive the subsequent deposits.

Figure 20:
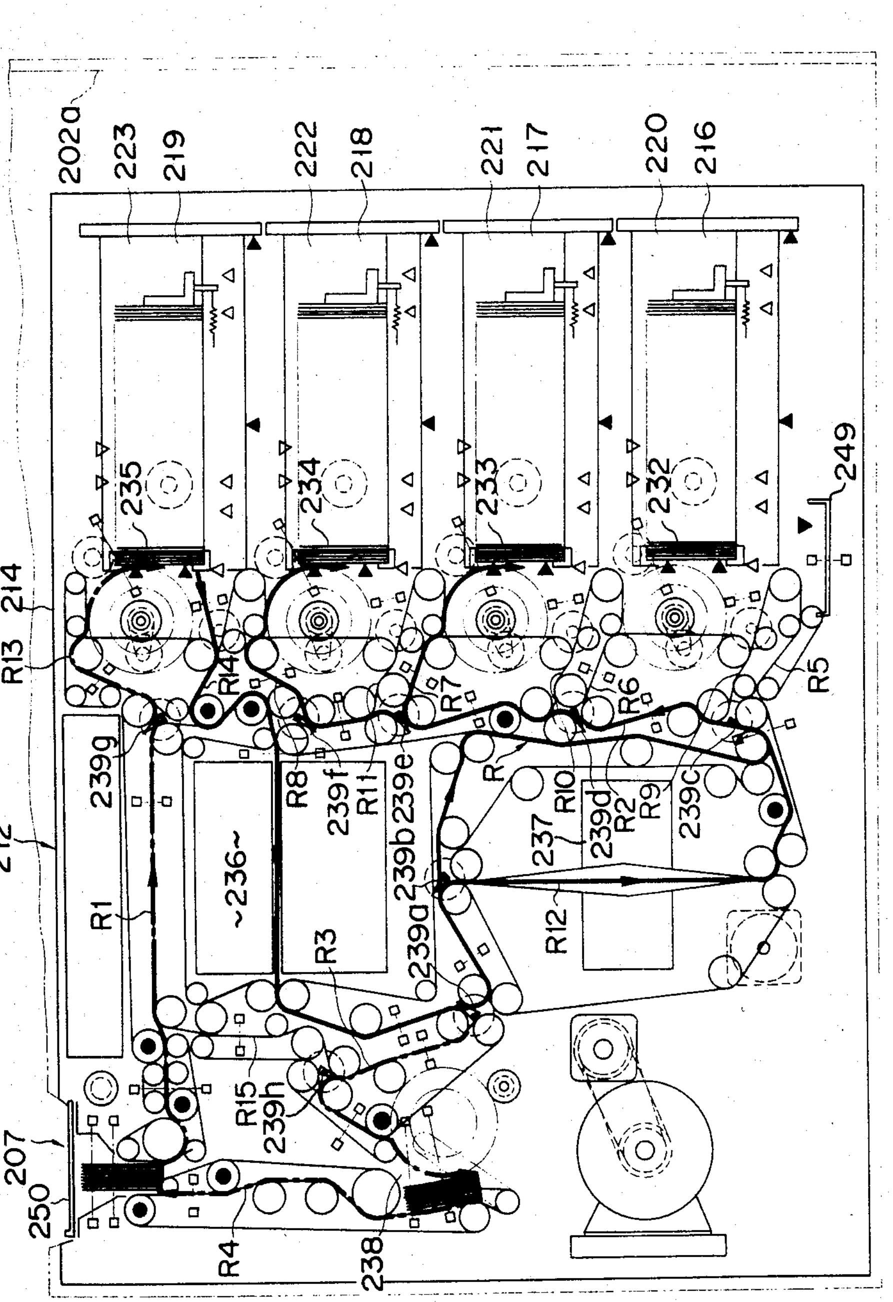
FIG. 20 is a side view showing a bill flow when the bills are replenished.

Replenishing of the bills will be described with reference to the fill flow shown in FIG. 20.

When the second storage section 221 or the third storage section 222 becomes almost empty, ending of bills is indicated. The personnel depress a replenishing button of the internal monitor unit 213 and enter the number of bills to be replenished of each of the predetermined denominations with a keyboard on the internal monitor unit 213. In this case, the main control section 90 stores the respective replenishing bill number data in a memory 92. The main control section 90 also causes the CRT display unit 210 to display a message "Replenishing. Please wait".

The main control section 90 checks in accordance with the detection signal from the sensor 241*h* whether or not the bills are present in the fourth storage section 223. If the main control section 90 detects that no bills are present, the main control section 90 causes the operating state code display to display an error code and the recovery/loading indicator to indicate that no bills are present. Upon display of the error code, the personnel enter a mixture of bills of the second and third denominations in the fourth storage section 223 of the fourth bill cassette 219.

Thereafter, the personnel depress the replenishing button. However, when the recovered bills are present, they must be removed and the bills to be replenished are stored.

When the sufficient bills are present, the main control section 90 causes the bill receiving/dispensing mechanism 212 to dispense bills, one by one, from the storage section 223 in the same manner as the deposit transaction operation. The bill is then conveyed along the fourteenth convey path R14 and the rear half portion of the first convey path R1 and passes through the discrimination section 236. The discrimination section 236 discriminates the bill and the discrimination result is supplied to the main control section 90. The main control section 90 causes the counter to count the number of bills of the second and third denominations by the discrimination results and checks whether the bills are "authentic". Therefore, the authentic bills passed through the discrimination section 236 are stacked in the corresponding temporary storary sections 234 and 233. In practice, the selector gate 239*a* is pivoted to the left, and the authentic bills passed through the discrimination section 236 are conveyed toward the corresponding storage sections 221 and 222 through the second convey path R2, as indicated by the thick solid line in FIG. 20. On the other hand, the rejected bills passed through the discrimination section 236 are conveyed in the temporary stacking section 238 through the third conveyed path R3 since the selector gate 239*a* is pivoted to the right.

In this case, the main control section 90 checks whether or not the discriminated number of bills of the second and third denominations coincide with the preset numbers, respectively. After the discriminated number of bills of the second or third denomination coincides with the preset number thereof and when a bill having the same denomination as in the coincided denomination passes through the discrimination section 236, this bill is regarded as a rejected bill and is stored in the temporary stacking section 238. On the other hand, when the discriminated number of bills of the second and third denominations coincide with the preset numbers, respectively, the last bill having the same denomination as the coincided denomination is conveyed and is stored in the corresponding temporary storage section 233 or 234. Thereafter, when the main control section 90 detects that no bills are left in any one of the convey paths R1 to R15 in response to the detection signals from the sensors 240*a* to 240*u*, all the convey members are stopped. In this case, the main control section 90 is operated to collectively transfer the rejected bills stacked in the temporary stacking section 238 to the bill storage chamber 251, as indicated by the thick alternate long and short dashed line in FIG. 20. The bills are fed, one by one, in the same manner as in the recovery operation and are stacked in the temporary storage section 235 of the fourth storage section 223. Upon detecting that no residual bills are present, the bills in the temporary storage section 235 are stored in the fourth storage section 223.

When the series of replenishing operations are completed, the main control section 90 causes the printer (not shown) of the card/receipt processing unit 211 to print the replenishment content (i.e., the numbers of bills of the third and second denominations) on a journal and to issue the printed journal. At the same time, the main control section 90 causes the bill number display of the internal monitor unit 213 to display the numbers of bills of the third and second denominations. In addition, the main control section 90 causes the recovery/-loading display when any rejected bill is returned so as to signal the returning of the rejected bill to the bank personnel. The bank personnel can then remove the returned bills from the fourth storage section 223 by removing the fourth bill cassette 219 from the apparatus 201*a* and count the number of the returned bills.

The personnel check the numbers of bills of the respective denominations and the amounts in accordance with the count, the printed content of the journal, and the display content on the internal monitor unit 213. Upon such confirmation, the personnel depress the storage button of the internal monitor unit 213. The last bills stored in the temporary storage sections 233 and 234 are stored in the storage sections 221 and 222, respectively, thereby completing the replenishing operation. At this time, the main control section 90 adds the number of bills stored in the storage sections 222 and 221 with replenished numbers, respectively.

When the personnel over/underload the bills during replenishing or when identification cannot be performed due to personnel's miscalculation, the personnel depress a bill return button of the internal monitor unit 213. In this case, the all bills replenished in the second and third storage sections 221 and 222 and the temporary storage sections 234 and 234 are dispensed, one by one, in the same manner as the withdrawal transaction operation and are conveyed in the discrimination section 236 through the tenth convey path R10 or the eleventh convey path R11, the rear half portion of the second convey path R2, and the rear half portion of the first convey path R1. The selector gates 239*a*, 239*h* and 239*g* are pivoted to the right, left and left, respectively. Therefore, the bills passing through the discrimination section 236 are conveyed in the third convey path R3 in accordance with the right position of the selector gate 239*a*, and are conveyed in the fifteenth convey path R15 in accordance with the left position of the selector gate 239*h*.

Thereafter, the bills are conveyed from the fifteenth convey path R15 to the first convey path R1 and are conveyed in the thirteenth convey path R13 in accordance with the left position of the selector gate 239*g*. The recovered bills are then stored in the temporary storage section 235 of the fourth storage section 223 and then in the fourth storage section 223. This operation is repeated in the same manner as in replenishing every time 100 bills are stacked, so that the number of the replenished bills are returned from the third and second storage sections 222 and 221 and the corresponding temporary storage sections 234 and 233. The above operation is repeated until no more bills are conveyed along the convey path, thus completing the replenishing operation.

As described above, when the number of bills stored in the third or second storage section 222 or 221 is running out (ending) in the apparatus 261*a*, the personnel can replenish a desired number of bills in the apparatus 201*b* with the apparatus 201*a*. Therefore, toward the end of the banking hours, the personnel can replenish the bills which they consider will be required for the rest of that day, thereby preventing waste of time which is caused by loading.

In the above embodiment, the bills to be replenished are bills of the second and third denominations which are used for the withdrawal transactions. However, replenishment can be made for the bills of other denominations.

As is apparent from the above description, replenishment is performed in units of 100 bills. Even if the bills are jammed in the dispensing section, the convey section or the stacking or storage section during operation, the number of bills stored before jamming occurs has been counted. Therefore, the bills entered in the third and second storage sections 222 and 221 are left therein, and only the bills stored in the temporary storage sections 234 and 233 are subjected to convey and dispense. After the apparatus 201*a* is reset, it can continue to operate upon depression of the replenishing button. In this manner, recovery operation by the bank personnel can be performed simply when a problem occurs.

In replenishment, the surfaces of the bills are aligned and the fit bills are set in the apparatus 1 according to the common practice in banking procedures. However, even if the obverse/reverse-presented bills and fit/unfit bills are mixed, discrimination procedures such as "denomination discrimination", "obverse/reverse-presented discrimination", "fit/unfit discrimination" and "true (authentic)/false (counterfeit) discrimination" are performed in the same manner as in the deposit transaction operation.

When replenishment is performed by using the fourth bill cassette 219, depression of the replenishing button becomes effected when the customer is waiting. While the customer operates at the operation panel, the replenishing button cannot be effected even if it is depressed. The start of replenishment is displayed at the CRT display unit 210, and the end thereof restores automatic transaction operation. However, while the bills are replenished, transactions excluding a deposit can be performed. Even a deposit/withdrawal transaction can be performed up to the step wherein a card/passbook is inserted in the apparatus 201*a*.

According to the present invention as described above, in an automatic bank note transaction system having the center CPU and the plurality of automatic bank note transaction apparatuses connected to the center CPU on the on-line basis, the plurality of automatic bank note transaction apparatuses are divided into the plurality of groups, and the means is provided to produce data indicating from which apparatus of a group excessive bills are to be removed and which apparatus of the given group is to be replenished with the excessive bills. Therefore, the bank personnel at each bank branch can easily determine from which apparatus to which apparatus excessive bills are to be transferred. The bill replenishment and bill transfer between the automatic bank note transaction apparatuses can be easily performed in units of bank branches. In addition, the unused capital in the apparatuses can be minimized. As an unmanned automatic replenishing system of automatic teller machines which is expected to be used soon, the subject of the present invention will be effectively used.

What is claimed is:

1. An automatic bank note transaction system comprising:

a central processing unit; and a plurality of automatic bank note transaction apparatuses which are connected to said central processing unit in an on-line basis, each automatic bank note transaction apparatus including a housing; storing means disposed in said housing for storing bank notes therein; and detecting means for detecting the amount of the bank notes stored in said storing means and generating a detection signal, regulating means for discriminating in response to the detection signal from said detecting means which automatic bank note transaction apparatus is capable of dispensing the bank notes since said storing means thereof is filled with the bank notes and, which automatic bank note transaction apparatus requires bank note replenishment since said storing means thereof is empty, and for generating a discrimination signal; and output means, connected to said regulating means, for generating output data representing the apparatus from which excessive bank notes are to be dispensed, and which apparatus is to be replenished with the bank notes in response to the discrimination signal from said regulating means.

2. The system according to claim 1, wherein each such automatic bank note transaction apparatus includes:

a cash inlet port and a cash outlet port which are formed in said housing;

first conveying means for conveying the bank notes from said cash inlet port to said storing means; and second conveying means for conveying the bank notes from said storing means to said cash outlet port.

3. The system according to claim 2, wherein said automatic bank note transaction apparatus which is capable of dispensing the bank notes is operated such that the bank notes are dispensed at said cash outlet port by said second conveying means, and said automatic bank note transaction apparatus which requires bank note replenishing is operated such that the bank notes are received from said cash inlet port by said first conveying means.

4. The system according to claim 3, wherein said storing means includes:

a bank note storage chamber;

receiving/dispensing means for receiving in said bank note storage chamber the bank notes which are conveyed by said first conveying means, and for dispensing by said second conveying means the bank notes stored in said bank note storage member; and a backup member for biasing the bank notes in said bank note storage chamber toward said receiving/-dispensing means.

5. The system according to claim 4, wherein said detecting means includes:

a detected member mounted on said backup member; and a plurality of detecting members mounted in said bank note storage chamber to detect the position of said detected member.

6. The system according to claim 5, wherein said plurality of detecting members comprise a first detecting member which is disposed along a bank note storing direction, to detect a replenishable state which allows replenishment of the bank notes, and a second detecting member for detecting a replenishment-required state which requires replenishment of the bank notes.

7. The system according to claim 6, wherein said plurality of detecting members further comprise a third detecting member for detecting an empty state of said storing means, and a fourth detecting member for detecting a full state of said storing means.

8. The system according to claim 2, wherein each said automatic bank note transaction apparatus includes:

a second storing means, detachably disposed in said housing, for storing the bank notes for partial examination or replenishment;

third conveying means for conveying to said storing means the bank notes which are stored in said second storing means; and fourth conveying means for conveying to said second storing means the bank notes which are stored in said storing means.

9. The system according to claim 8, wherein said automatic bank note transaction apparatus which is capable of dispensing the bank notes is operated such that the bank notes stored in said storing means are conveyed to said second storing means, and said automatic bank note transaction apparatus which requires replenishment is operated such that the bank notes stored in said second storing means are conveyed to said storing means by said third conveying means.

10. The system according to claim 9, wherein said storing means includes:

a bank note storage chamber;

receiving/dispensing means for receiving in said bank note storage chamber the bank notes which are conveyed by said first conveying means and, for dispensing by said second conveying means the bank notes stored in said bank note storing member; and a backup member for biasing the bank notes in said bank note storage chamber toward said receiving/-dispensing means.

11. The system according to claim 10, wherein said detecting means includes:

a detected member mounted on said backup member; and a plurality of detecting members mounted in said bank note storage chamber to detect position of said detected member.

12. The system according to claim 11, wherein said plurality of detecting members comprise a first detecting member which is disposed along a bank note storing direction, to detect a replenishable state which allows replenishment of the bank notes, and a second detecting member for detecting a replenishment-required state which requires replenishment of bank notes.

13. The system according to claim 12, wherein said plurality of detecting members further comprise a third detecting member for detecting an empty state of said storing means, and a fourth detecting member for detecting a full state of said storing means.

* * * * *